(12) United States Patent
Wu et al.

(10) Patent No.: US 10,911,122 B2
(45) Date of Patent: Feb. 2, 2021

(54) REFERENCE SIGNAL SENDING METHOD, REFERENCE SIGNAL RECEIVING METHOD, NETWORK DEVICE, AND TERMINAL DEVICE

(71) Applicant: HUAWEI TECHNOLOGIES CO., LTD., Guangdong (CN)

(72) Inventors: Ye Wu, Shanghai (CN); Huangping Jin, Shanghai (CN); Wei Han, Shanghai (CN); Xiaoyan Bi, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/710,410

(22) Filed: Dec. 11, 2019

(65) Prior Publication Data
US 2020/0119794 A1  Apr. 16, 2020

Related U.S. Application Data

(63) Continuation of application No. PCT/CN2018/087789, filed on May 22, 2018.

(30) Foreign Application Priority Data

Jun. 15, 2017  (CN) .......................... 2017 1 0453767

(51) Int. Cl.
*H04W 72/04* (2009.01)
*H04B 7/06* (2006.01)

(52) U.S. Cl.
CPC ......... *H04B 7/0626* (2013.01); *H04B 7/0617* (2013.01); *H04B 7/0639* (2013.01); *H04W 72/042* (2013.01)

(58) Field of Classification Search
USPC .................................................. 375/267, 219
See application file for complete search history.

(56) References Cited

U.S. PATENT DOCUMENTS 8,787,485 B2 * 7/2014 Liu ...................... H04B 7/0486
375/267
8,848,603 B2 * 9/2014 Luo ...................... H04B 7/0456
370/328

(Continued)

FOREIGN PATENT DOCUMENTS

CN   103166688 A   6/2013
CN   103873124 A   6/2014

(Continued)

OTHER PUBLICATIONS

NTT DOCOMO, "Discussion on DL transmission scheme 2", 3GPP TSG HAN WG1 Meeting #89 R1-1708449, May 15-19, 2017. (6 pages).

(Continued)

*Primary Examiner* — Eva Y Puente
(74) *Attorney, Agent, or Firm* — Westerman, Hattori, Daniels & Adrian, LLP

(57) ABSTRACT

This application provides a reference signal sending method, a reference signal receiving method, a network device, and a terminal device, to perform CSI (Channel State Information) measurement by using more precoding vectors (or precoding matrices), to measure more equivalent channels, thereby improving flexibility and a spatial degree of freedom of network device scheduling. The method includes: performing, by the network device, precoder cycling on a first reference signal by using at least two precoding vectors, to obtain a precoded first reference signal, where the precoded first reference signal is borne in a plurality of physical resource groups, and signals borne in any two adjacent physical resource groups correspond to different precoding (Continued)

vectors; and sending, by the network device, the precoded first reference signal to the terminal device by using the plurality of physical resource groups, where the first reference signal is used by the terminal device to perform CSI measurement.

16 Claims, 9 Drawing Sheets

(56) References Cited

U.S. PATENT DOCUMENTS

| | | | | |
|---|---|---|---|---|
| 8,923,366 | B2* | 12/2014 | Park | H04B 7/0456 370/248 |
| 2010/0284484 | A1* | 11/2010 | Jongren | H04B 7/10 375/267 |
| 2011/0255483 | A1 | 10/2011 | Xu et al. | |
| 2015/0358061 | A1 | 12/2015 | Zhang | |
| 2016/0043843 | A1 | 2/2016 | Liu et al. | |
| 2016/0211895 | A1* | 7/2016 | Onggosanusi | H04B 7/0613 |
| 2017/0134080 | A1 | 5/2017 | Rahman et al. | |
| 2018/0337714 | A1* | 11/2018 | Kuchi | H04W 72/042 |
| 2019/0123950 | A1* | 4/2019 | Wang | H04L 27/2646 |

FOREIGN PATENT DOCUMENTS

| | | |
|---|---|---|
| CN | 104184537 A | 12/2014 |
| CN | 106209331 A | 12/2016 |
| CN | 106685490 A | 5/2017 |
| WO | 2014077809 A1 | 5/2014 |
| WO | 2015172393 A1 | 11/2015 |

OTHER PUBLICATIONS

International Search Report dated Jul. 27, 2018, issued in counterpart PCT Application No. PCT/CN2018/087789, with English Translation. (11 pages).

Extended European Search Report dated Feb. 17, 2020, issued in counterpart EP Application No. 18818231.5. (17 pages).

Office Action dated Oct. 30, 2020, issued in counterpart CN Application No. 201710453767.3, with English Translation. (20 pages).

* cited by examiner

REFERENCE SIGNAL SENDING METHOD, REFERENCE SIGNAL RECEIVING METHOD, NETWORK DEVICE, AND TERMINAL DEVICE

CROSS-REFERENCE TO RELATED APPLICATIONS

This application is a continuation of International Application No. PCT/CN2018/087789, filed on May 22, 2018, which claims priority to Chinese Patent Application No. 201710453767.3, filed on Jun. 15, 2017. The disclosures of the aforementioned applications are hereby incorporated by reference in their entireties.

TECHNICAL FIELD

This application relates to the wireless communications field, and more specifically, to a reference signal sending method, a reference signal receiving method, a network device, and a terminal device.

BACKGROUND

In a multiple-antenna technology, a precoding (precoding) technology is usually used to improve a channel. To obtain relatively good transmission reliability, a network device may calculate and select a precoding matrix (precoding matrix) based on channel state information (channel state information, CSI) fed back by a terminal device. In addition, feedback by the terminal device depends on measurement of a channel state information reference signal (channel state information reference signal, CSI-RS). Therefore, in the prior art, it is considered that a beamformed (beamformed) CSI-RS is used to perform CSI measurement, to obtain the feedback by the terminal device, thereby reducing pilot overheads and improving channel measurement accuracy.

However, the beamformed CSI-RS is usually used to perform CSI measurement on an equivalent channel corresponding to a precoding matrix, and the terminal device performs CSI measurement based on the beamformed CSI-RS, that is, CSI fed back for measurement of the equivalent channel corresponding to the precoding matrix. Therefore, this CSI measurement manner is not sufficiently flexible, and flexibility and a spatial degree of freedom of network device scheduling are greatly limited.

SUMMARY

This application provides a reference signal sending method, a reference signal receiving method, a network device, and a terminal device, to perform CSI measurement by using more precoding vectors (or precoding matrices), to measure more equivalent channels.

According to a first aspect, a reference signal sending method is provided. The method includes:

performing, by a network device, precoder cycling on a first reference signal by using at least two precoding vectors, to obtain a precoded first reference signal, where the precoded first reference signal is borne in a plurality of physical resource groups, and signals borne in any two adjacent physical resource groups correspond to different precoding vectors; and sending, by the network device, the precoded first reference signal to a terminal device by using the plurality of physical resource groups, where the first reference signal is used by the terminal device to perform CSI measurement on a downlink channel.

Therefore, in this embodiment of the present invention, the network device performs precoder cycling on the first reference signal by using the at least two precoding vectors, so that CSI measurement may be performed on the first reference signal by using the at least two precoding vectors, that is, measurement is performed on equivalent channels corresponding to different precoding vectors, to measure different equivalent channels. Compared with the prior art in which one reference signal is precoded by using one precoding vector in one measurement bandwidth to measure an equivalent channel corresponding to the precoding vector, in the technical solutions in this application, more measurement results can be obtained, thereby improving flexibility and a spatial degree of freedom of network device scheduling. Further, a precoding matrix used for cycling is provided for a precoder cycling transmission solution, to ensure reliable data transmission and improve robustness of a transmission system. Furthermore, because the first reference signal is precoded through precoder cycling, compared with a non-cycling case, a channel may be measured more fairly. Two resources that are relatively close to each other are measured by using different precoding vectors, that is, a same resource is measured by using different precoding vectors. In addition, measurement is performed once by using a same precoding vector at regular frequencies, that is, measurement is performed at each small bandwidth granularity. Therefore, a measurement result obtained through the measurement is more accurate, thereby facilitating reliable data transmission and improving the robustness of the transmission system.

It may be understood that for a plurality of reference signals borne in the plurality of physical resource groups, the network device may perform precoder cycling on the plurality of reference signals by using at least two precoding matrices, to measure equivalent channels corresponding to different precoding matrices.

Optionally, the performing, by a network device, precoder cycling on a first reference signal by using at least two precoding vectors includes:

performing, by the network device, precoder cycling on the first reference signal by using the at least two precoding vectors based on each parameter in a precoder cycling parameter group.

In this embodiment of the present invention, all or some of the parameters in the precoder cycling parameter group may be predefined, or may be determined by the network device and then notified to the terminal device.

Optionally, at least one parameter in the precoder cycling parameter group is preconfigured in the network device and the terminal device.

The precoder cycling parameter group is preconfigured in the network device and the terminal device, so that signaling overheads caused by indication information are reduced.

Optionally, the method further includes:

sending, by the network device, first indication information to the terminal device, where the first indication information includes an index of the precoder cycling parameter group or the at least one parameter in the precoder cycling parameter group.

The at least one parameter in the precoder cycling parameter group may be indicated by using signaling, so that a parameter in the precoder cycling parameters may be dynamically adjusted. Compared with the foregoing method for predefining the precoder cycling parameter, this method is more flexible.

Optionally, the first indication information may be borne in at least one of the following messages:

a radio resource control (radio resource control, RRC) message, a medium access control (media access control, MAC) control element (control element, CE), and downlink control information (downlink control information, DCI).

The first indication information is borne by using any one of the foregoing signaling, so that the precoder cycling parameter may be dynamically adjusted.

Optionally, the method further includes:

sending, by the network device, resource configuration (resource setting) information to the terminal device, where the resource configuration information is used to indicate a time-frequency resource bearing the precoded first reference signal.

Optionally, the resource configuration information includes any one of the following:

resource configuration information of the first reference signal;

resource configuration information of a plurality of reference signals borne in the plurality of physical resource groups; or resource configuration information of a plurality of reference signals borne in a resource set, where the resource set includes the plurality of physical resource groups, and the plurality of reference signals borne in the resource set correspond to a same precoder cycling parameter.

Optionally, the method further includes:

sending, by the network device, CSI reporting configuration (CSI reporting setting) information to the terminal device, where the CSI reporting configuration information is used to indicate CSI needing to be reported by the terminal device.

Optionally, the method further includes:

sending, by the network device, CSI measurement configuration (CSI measurement setting) information to the terminal device, where the CSI measurement configuration information is used to indicate a correspondence between the resource configuration information and the CSI reporting configuration information.

Optionally, the CSI measurement configuration information includes at least one of the following: CSI, a resource configuration indication, a quantity of to-be-measured channels, a to-be-measured interfering channel, and a CSI reporting configuration indication. Optionally, the first indication information is configured in at least one of the following information: the resource configuration information, the CSI reporting configuration information, or the CSI measurement configuration information.

For example, the at least one parameter in the precoder cycling parameter group or the index of the precoder cycling parameter group may be indicated by using an indication field in any one of the foregoing information.

Optionally, the method further includes:

sending, by the network device, second indication information to the terminal device, where the second indication information is used to indicate whether a precoder cycling mode is used for the precoded first reference signal.

Optionally, the second indication information is borne in at least one of the following messages: an RRC message, a MAC CE, and DCI.

Optionally, the second indication information is configured in at least one of the following information: the resource configuration information, the CSI reporting configuration information, or the CSI measurement configuration information.

Optionally, the resource configuration information may be borne in any one of the following messages: an RRC message, a MAC CE, or DCI.

Optionally, the CSI reporting configuration information may be borne in any one of the following messages: an RRC message, a MAC CE, or DCI.

Optionally, the CSI measurement configuration information may be borne in any one of the following messages: an RRC message, a MAC CE, or DCI.

According to a second aspect, a reference signal receiving method is provided. The method includes:

receiving, by a terminal device by using a plurality of physical resource groups, a precoded first reference signal sent by a network device, where signals borne in any two adjacent physical resource groups correspond to different precoding vectors; and performing, by the terminal device, channel state information CSI measurement on a downlink channel based on the precoded first reference signal.

Therefore, in this embodiment of the present invention, the network device performs precoder cycling on the first reference signal by using the at least two precoding vectors, so that CSI measurement may be performed on the first reference signal by using the at least two precoding vectors, that is, measurement is performed on equivalent channels corresponding to different precoding vectors, to measure different equivalent channels. Compared with the prior art in which one reference signal is precoded by using one precoding vector in one measurement bandwidth to measure an equivalent channel corresponding to the precoding vector, in the technical solutions in this application, more measurement results can be obtained, thereby improving flexibility and a spatial degree of freedom of network device scheduling. Further, a precoding matrix used for cycling is provided for a precoder cycling transmission solution, to ensure reliable data transmission and improve robustness of a transmission system. Furthermore, because the first reference signal is precoded through precoder cycling, compared with a non-cycling case, a channel may be measured more fairly. Two resources that are relatively close to each other are measured by using different precoding vectors, that is, a same resource is measured by using different precoding vectors. In addition, measurement is performed once by using a same precoding vector at regular frequencies, that is, measurement is performed at each small bandwidth granularity. Therefore, a measurement result obtained through the measurement is more accurate, thereby facilitating reliable data transmission and improving the robustness of the transmission system.

It may be understood that for a plurality of reference signals borne in the plurality of physical resource groups, the network device may perform precoder cycling on the plurality of reference signals by using at least two precoding matrices, to measure equivalent channels corresponding to different precoding matrices.

Optionally, the performing, by the terminal device, CSI measurement on a downlink channel based on the precoded first reference signal includes:

performing, by the terminal device, CSI measurement on the downlink channel based on each parameter in a precoder cycling parameter group and the precoded first reference signal.

In this embodiment of the present invention, all or some of the parameters in the precoder cycling parameter group may be predefined, or may be determined by the network device and then notified to the terminal device.

Optionally, at least one parameter in the precoder cycling parameter group is preconfigured in the terminal device and the network device.

The precoder cycling parameter group is preconfigured in the network device and the terminal device, so that signaling overheads caused by indication information are reduced.

Optionally, the method further includes:
receiving, by the terminal device, first indication information sent by the network device, where the first indication information includes an index of the precoder cycling parameter group or the at least one parameter in the precoder cycling parameter group.

The at least one parameter in the precoder cycling parameter group may be indicated by using signaling, so that a parameter in the precoder cycling parameters may be dynamically adjusted. Compared with the foregoing method for predefining the precoder cycling parameter, this method is more flexible.

Optionally, the first indication information may be borne in at least one of the following messages:
a radio resource control (radio resource control, RRC) message, a medium access control (media access control, MAC) control element (control element, CE), and downlink control information (downlink control information, DCI).

The first indication information is borne by using any one of the foregoing signaling, so that the precoder cycling parameter may be dynamically adjusted.

Optionally, the method further includes:
receiving, by the terminal device, resource configuration information sent by the network device, where the resource configuration information is used to indicate a time-frequency resource bearing the precoded first reference signal.

Optionally, the resource configuration information includes any one of the following:
resource configuration information of the first reference signal;
resource configuration information of a plurality of reference signals borne in the plurality of physical resource groups; or resource configuration information of a plurality of reference signals borne in a resource set, where the resource set includes the plurality of physical resource groups, and the plurality of reference signals borne in the resource set correspond to a same precoder cycling parameter.

Optionally, the method further includes:
receiving, by the terminal device, CSI reporting configuration information sent by the network device, where the CSI reporting configuration information is used to indicate CSI needing to be reported by the terminal device.

Optionally, the method further includes:
receiving, by the terminal device, CSI measurement configuration information sent by the network device, where the CSI measurement configuration information is used to indicate a correspondence between the resource configuration information and the CSI reporting configuration information.

Optionally, the CSI measurement configuration information includes at least one of the following: CSI, a resource configuration indication, a quantity of to-be-measured channels, a to-be-measured interfering channel, and a CSI reporting configuration indication.

For example, the at least one parameter in the precoder cycling parameter group or the index of the precoder cycling parameter group may be indicated by using an indication field in any one of the foregoing information.

Optionally, the method further includes:
receiving, by the terminal device, second indication information sent by the network device, where the second indication information is used to indicate whether a precoder cycling mode is used for the precoded first reference signal.

Optionally, the second indication information is borne in at least one of the following messages: an RRC message, a MAC CE, and DCI.

Optionally, the second indication information is configured in at least one of the following information: the resource configuration information, the CSI reporting configuration information, or the CSI measurement configuration information.

Optionally, the resource configuration information may be borne in any one of the following messages: an RRC message, a MAC CE, or DCI.

Optionally, the CSI reporting configuration information may be borne in any one of the following messages: an RRC message, a MAC CE, or DCI.

Optionally, the CSI measurement configuration information may be borne in any one of the following messages: an RRC message, a MAC CE, or DCI.

According to a third aspect, a reference signal sending method is provided. The method includes:
performing, by a terminal device, precoder cycling on a second reference signal by using at least two precoding vectors, to obtain a precoded second reference signal, where the precoded second reference signal is borne in a plurality of physical resource groups, and signals borne in any two adjacent physical resource groups correspond to different precoding vectors; and
sending, by the terminal device, the precoded second reference signal to the network device, where the second reference signal is used by the network device to perform channel state information CSI measurement on an uplink channel.

Therefore, in this embodiment of the present invention, the terminal device performs precoder cycling on the second reference signal by using the at least two precoding vectors, so that CSI measurement may be performed on the second reference signal by using the at least two precoding vectors, that is, measurement is performed on equivalent channels corresponding to different precoding vectors, to measure different equivalent channels. CSI of the uplink channel that is obtained by the network device through measurement may be indicated to the terminal device, so that the terminal device performs uplink transmission, or may determine CSI of a downlink channel by using channel reciprocity, to perform downlink transmission. Therefore, compared with the prior art, in the technical solutions in this application, more measurement results can be obtained, thereby improving flexibility and a spatial degree of freedom of network device scheduling. Further, a precoding matrix used for cycling is provided for a precoder cycling transmission solution, to ensure reliable data transmission and improve robustness of a transmission system. Furthermore, because the second reference signal is precoded through precoder cycling, compared with a non-cycling case, a channel may be measured more fairly. Two resources that are relatively close to each other are measured by using different precoding vectors, that is, a same resource is measured by using different precoding vectors. In addition, measurement is performed once by using a same precoding vector at regular frequencies, that is, measurement is performed at each small bandwidth granularity. Therefore, a measurement result obtained through the measurement is more accurate, thereby facilitating reliable data transmission and improving the robustness of the transmission system.

It may be understood that for a plurality of reference signals borne in the plurality of physical resource groups, the network device may perform precoder cycling on the plurality of reference signals by using at least two precoding matrices, to measure equivalent channels corresponding to different precoding matrices.

Optionally, the performing, by a terminal device, precoder cycling on a second reference signal by using at least two precoding vectors includes:

performing, by the terminal device, precoder cycling on the second reference signal by using the at least two precoding vectors based on each parameter in a precoder cycling parameter group.

In this embodiment of the present invention, all or some of the parameters in the precoder cycling parameter group may be predefined, or may be determined by the network device and then notified to the terminal device.

Optionally, at least one parameter in the precoder cycling parameter group is preconfigured in the network device and the terminal device.

The precoder cycling parameter group is preconfigured in the network device and the terminal device, so that signaling overheads caused by indication information are reduced.

Optionally, the method further includes:

receiving, by the terminal device, third indication information sent by the network device, where the third indication information includes an index of the precoder cycling parameter group or the at least one parameter in the precoder cycling parameter group.

The at least one parameter in the precoder cycling parameter group may be indicated by using signaling, so that a parameter in the precoder cycling parameters may be dynamically adjusted. Compared with the foregoing method for predefining the precoder cycling parameter, this method is more flexible.

Optionally, the third indication information may be borne in at least one of the following messages: an RRC message, a MAC CE, or DCI.

The third indication information is borne by using any one of the foregoing signaling, so that the precoder cycling parameter may be dynamically adjusted.

Optionally, the method further includes:

receiving, by the terminal device, resource configuration information sent by the network device, where the resource configuration information is used to indicate a time-frequency resource bearing the precoded second reference signal.

Optionally, the resource configuration information includes any one of the following:

resource configuration information of the second reference signal;

resource configuration information of a plurality of reference signals borne in the plurality of physical resource groups; or resource configuration information of a plurality of reference signals borne in a resource set, where the resource set includes the plurality of physical resource groups, and the plurality of reference signals borne in the resource set correspond to a same precoder cycling parameter.

Optionally, the third indication information is configured in the resource configuration information.

For example, the at least one parameter in the precoder cycling parameter group or the index of the precoder cycling parameter group is indicated by using an indication field in the resource configuration information.

Optionally, the method further includes:

receiving, by the terminal device, fourth indication information sent by the network device, where the fourth indication information is used to indicate whether the terminal device uses a precoder cycling mode.

Optionally, the fourth indication information is borne in at least one of the following messages: an RRC message, a MAC CE, and DCI.

Optionally, the fourth indication information is configured in the resource configuration information.

Optionally, the resource configuration information may be borne in any one of the following messages: an RRC message, a MAC CE, or DCI.

In this embodiment of the present invention, the second reference signal may be used by the network device to perform CSI measurement on the uplink channel, or may be used to determine, by using channel reciprocity, CSI of a downlink channel in a time division duplex (time division duplexing, TDD) mode.

If the second reference signal is used to perform CSI measurement on the uplink channel, optionally, the method further includes:

receiving, by the terminal device, CSI of the uplink channel that is sent by the network device, where the CSI of the uplink channel is obtained by the network device after performing CSI measurement based on the precoded second reference signal.

According to a fourth aspect, a reference signal receiving method is provided. The method includes:

receiving, by a network device by using a plurality of physical resource groups, a precoded second reference signal sent by a terminal device, where signals borne in any two adjacent physical resource groups correspond to different precoding vectors; and performing, by the network device, CSI measurement on an uplink channel based on the precoded second reference signal.

Therefore, in this embodiment of the present invention, the terminal device performs precoder cycling on the second reference signal by using the at least two precoding vectors, so that CSI measurement may be performed on the second reference signal by using the at least two precoding vectors, that is, measurement is performed on equivalent channels corresponding to different precoding vectors, to measure different equivalent channels. CSI of the uplink channel that is obtained by the network device through measurement may be indicated to the terminal device, so that the terminal device performs uplink transmission, or may determine CSI of a downlink channel by using channel reciprocity, to perform downlink transmission. Therefore, compared with the prior art, in the technical solutions in this application, more measurement results can be obtained, thereby improving flexibility and a spatial degree of freedom of network device scheduling. Further, a precoding matrix used for cycling is provided for a precoder cycling transmission solution, to ensure reliable data transmission and improve robustness of a transmission system. Furthermore, because the second reference signal is precoded through precoder cycling, compared with a non-cycling case, a channel may be measured more fairly. Two resources that are relatively close to each other are measured by using different precoding vectors, that is, a same resource is measured by using different precoding vectors. In addition, measurement is performed once by using a same precoding vector at regular frequencies, that is, measurement is performed at each small bandwidth granularity. Therefore, a measurement result obtained through the measurement is more accurate, thereby facilitating reliable data transmission and improving the robustness of the transmission system.

It may be understood that for a plurality of reference signals borne in the plurality of physical resource groups, the network device may perform precoder cycling on the plurality of reference signals by using at least two precoding matrices, to measure equivalent channels corresponding to different precoding matrices.

Optionally, the performing, by the network device, CSI measurement on an uplink channel based on the precoded second reference signal includes:

performing, by the network device, CSI measurement on the uplink channel based on each parameter in a precoder cycling parameter group and the precoded second reference signal.

In this embodiment of the present invention, all or some of the parameters in the precoder cycling parameter group may be predefined, or may be determined by the network device and then notified to the terminal device.

Optionally, the precoder cycling parameter group includes at least a quantity of precoding vectors and a precoder cycling granularity.

The precoder cycling parameter group is preconfigured in the network device and the terminal device, so that signaling overheads caused by indication information are reduced.

Optionally, the method further includes:

sending, by the network device, third indication information to the terminal device, where the third indication information includes an index of the precoder cycling parameter group or the at least one parameter in the precoder cycling parameter group.

The at least one parameter in the precoder cycling parameter group may be indicated by using signaling, so that a parameter in the precoder cycling parameters may be dynamically adjusted. Compared with the foregoing method for predefining the precoder cycling parameter, this method is more flexible.

Optionally, the third indication information may be borne in at least one of the following messages: an RRC message, a MAC CE, or DCI.

The third indication information is borne by using any one of the foregoing signaling, so that the precoder cycling parameter may be dynamically adjusted.

Optionally, the method further includes:

sending, by the network device, resource configuration information to the terminal device, where the resource configuration information is used to indicate a time-frequency resource bearing the precoded second reference signal.

Optionally, the resource configuration information includes any one of the following:

resource configuration information of the second reference signal;

resource configuration information of a plurality of reference signals borne in the plurality of physical resource groups; or resource configuration information of a plurality of reference signals borne in a resource set, where the resource set includes the plurality of physical resource groups, and the plurality of reference signals borne in the resource set correspond to a same precoder cycling parameter.

Optionally, the third indication information is configured in the resource configuration information.

For example, the at least one parameter in the precoder cycling parameter group or the index of the precoder cycling parameter group is indicated by using an indication field in the resource configuration information.

Optionally, the method further includes:

sending, by the network device, fourth indication information to the terminal device, where the fourth indication information is used to indicate whether the terminal device uses a precoder cycling mode.

Optionally, the fourth indication information is borne in at least one of the following messages: an RRC message, a MAC CE, and DCI.

Optionally, the fourth indication information is configured in the resource configuration information.

Optionally, the resource configuration information may be borne in any one of the following messages: an RRC message, a MAC CE, or DCI.

In this embodiment of the present invention, the second reference signal may be used by the network device to perform CSI measurement on the uplink channel, or may be used to determine, by using channel reciprocity, CSI of a downlink channel in a time division duplex (time division duplexing, TDD) mode.

If the second reference signal is used to perform CSI measurement on the uplink channel, optionally, the method further includes:

sending, by the network device, CSI of the uplink channel to the terminal device, where the CSI of the uplink channel is obtained by the network device after performing CSI measurement based on the precoded second reference signal.

If the second reference signal is used to determine the CSI of the downlink channel, optionally, the method further includes:

determining, by the network device, the CSI of the downlink channel based on the CSI of the uplink channel, where the CSI of the uplink channel is obtained by the network device after performing CSI measurement based on the precoded second reference signal.

According to a fifth aspect, a network device is provided. The network device includes modules configured to perform the reference signal sending method according to any one of the first aspect or the possible implementations of the first aspect.

According to a sixth aspect, a terminal device is provided. The terminal device includes modules configured to perform the reference signal receiving method according to any one of the second aspect or the possible implementations of the second aspect.

According to a seventh aspect, a terminal device is provided. The terminal device includes modules configured to perform the reference signal sending method according to any one of the third aspect or the possible implementations of the third aspect.

According to an eighth aspect, a network device is provided. The network device includes modules configured to perform the reference signal receiving method according to any one of the fourth aspect or the possible implementations of the fourth aspect.

According to a ninth aspect, a network device is provided. The network device includes a transceiver, a processor, and a memory. The processor is configured to control the transceiver to send and receive a signal. The memory is configured to store a computer program. The processor is configured to invoke the computer program from the memory and run the computer program, to enable the network device to perform the method according to any one of the first aspect or the possible implementations of the first aspect, or the method according to any one of the fourth aspect or the possible implementations of the fourth aspect.

According to a tenth aspect, a terminal device is provided. The terminal device includes a transceiver, a processor, and a memory. The processor is configured to control the transceiver to send and receive a signal. The memory is configured to store a computer program. The processor is configured to invoke the computer program from the memory and run the computer program, to enable the terminal device to perform the method according to any one of the second aspect or the possible implementations of the second aspect, or the method according to any one of the third aspect or the possible implementations of the third aspect.

According to an eleventh aspect, a communications apparatus is provided. The communications apparatus may be the network device in the foregoing method designs, or may be a chip disposed in a network device. The communications apparatus includes a processor that is coupled to a memory and that may be configured to execute an instruction in the memory, to implement the method performed by the network device according to any one of the first aspect or the possible implementations of the first aspect, or the method according to any one of the fourth aspect or the possible implementations of the fourth aspect. Optionally, the communications apparatus further includes a memory. Optionally, the communications apparatus further includes a communications interface, and the processor is coupled to the communications interface.

When the communications apparatus is the network device, the communications interface may be a transceiver, or an input/output interface.

When the communications apparatus is a chip disposed in a network device, the communications interface may be an input/output interface.

Optionally, the transceiver may be a transceiver circuit.

Optionally, the input/output interface may be an input/output circuit.

According to a twelfth aspect, a communications apparatus is provided. The communications apparatus may be the terminal device in the foregoing method designs, or may be a chip disposed in a terminal device. The communications apparatus includes a processor that is coupled to a memory and that may be configured to execute an instruction in the memory, to implement the method performed by the terminal device according to any one of the second aspect or the possible implementations of the second aspect, or the method according to any one of the third aspect or the possible implementations of the third aspect. Optionally, the communications apparatus further includes a memory. Optionally, the communications apparatus further includes a communications interface, and the processor is coupled to the communications interface.

When the communications apparatus is the terminal device, the communications interface may be a transceiver, or an input/output interface.

When the communications apparatus is a chip disposed in a terminal device, the communications interface may be an input/output interface.

Optionally, the transceiver may be a transceiver circuit.

Optionally, the input/output interface may be an input/output circuit.

It should be understood that a function of the processor may be implemented by using hardware or software. When implemented by using hardware, the processor may be a logic circuit, an integrated circuit, or the like. When implemented by using software, the processor may be a general-purpose processor implemented by reading software code stored in a memory, and the memory may be integrated in the processor or may independently exist outside the memory.

According to a thirteenth aspect, a computer program product is provided. The computer program product includes computer program code. When the computer program code is run by a network device, the network device is enabled to perform the method according to any one of the first aspect or the possible implementations of the first aspect, or the method according to any one of the fourth aspect or the possible implementations of the fourth aspect.

According to a fourteenth aspect, a computer program product is provided. The computer program product includes computer program code. When the computer program code is run by a terminal device, the terminal device is enabled to perform the method according to any one of the second aspect or the possible implementations of the second aspect, or the method according to any one of the third aspect or the possible implementations of the third aspect.

According to a fifteenth aspect, a computer-readable medium is provided. The computer-readable medium stores program code, and the program code includes an instruction used to perform the method according to any one of the first aspect to the fourth aspect or the possible implementations of the first aspect to the fourth aspect.

Optionally, if the plurality of physical resource groups are used to bear only one reference signal (for example, a first reference signal or a second reference signal), the precoder cycling parameter group includes at least a quantity of precoding vectors and a precoder cycling granularity.

The quantity of precoding vectors indicates that the precoded first reference signal borne in the plurality of physical resource groups is obtained through precoding based on the different precoding vectors.

If the plurality of physical resource groups are used to bear a plurality of reference signals, the precoder cycling parameter group includes at least a quantity of precoding matrices and a precoder cycling granularity.

The quantity of precoding matrices indicates that a plurality of precoded reference signals borne in the plurality of physical resource groups are obtained through precoding based on the different precoding matrices.

Optionally, the precoder cycling granularity (precoder cycling granularity) is also referred to as a precoder cycling size (precoder cycling size), and indicates a quantity of resource units included in each physical resource group.

By way of example rather than limitation, the resource unit may be a resource block (resource block, RB) defined in an existing protocol (for example, a long time evolution (Long Time Evolution, LTE) protocol) or a resource block group (RB group, RBG).

Optionally, the plurality of physical resource groups are contiguously or discretely distributed in system bandwidth.

In this application, precoder cycling is performed on a same reference signal by using at least two precoding vectors, and CSI measurement may be performed by using more precoding vectors (or precoding matrices), to measure more equivalent channels, thereby improving flexibility and a spatial degree of freedom of network scheduling.

DESCRIPTION OF EMBODIMENTS

The following describes the technical solutions of this application with reference to the accompanying drawings.

It should be understood that the technical solutions in this application may be applied to various communications systems, for example, a global system for mobile communications (Global System of Mobile communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS) system, a long term evolution (Long Time Evolution, LTE) system, an advanced long term evolution (LTE-Advanced, LTE-A) system, a universal mobile telecommunications system (Universal Mobile Telecommunication System, UMTS), or a next-generation communications system (for example, a fifth-generation (fifth-generation, 5G) communications system). The 5G system may also be referred to as a new radio access technology (new radio access technology, NR) system.

Figure 1:
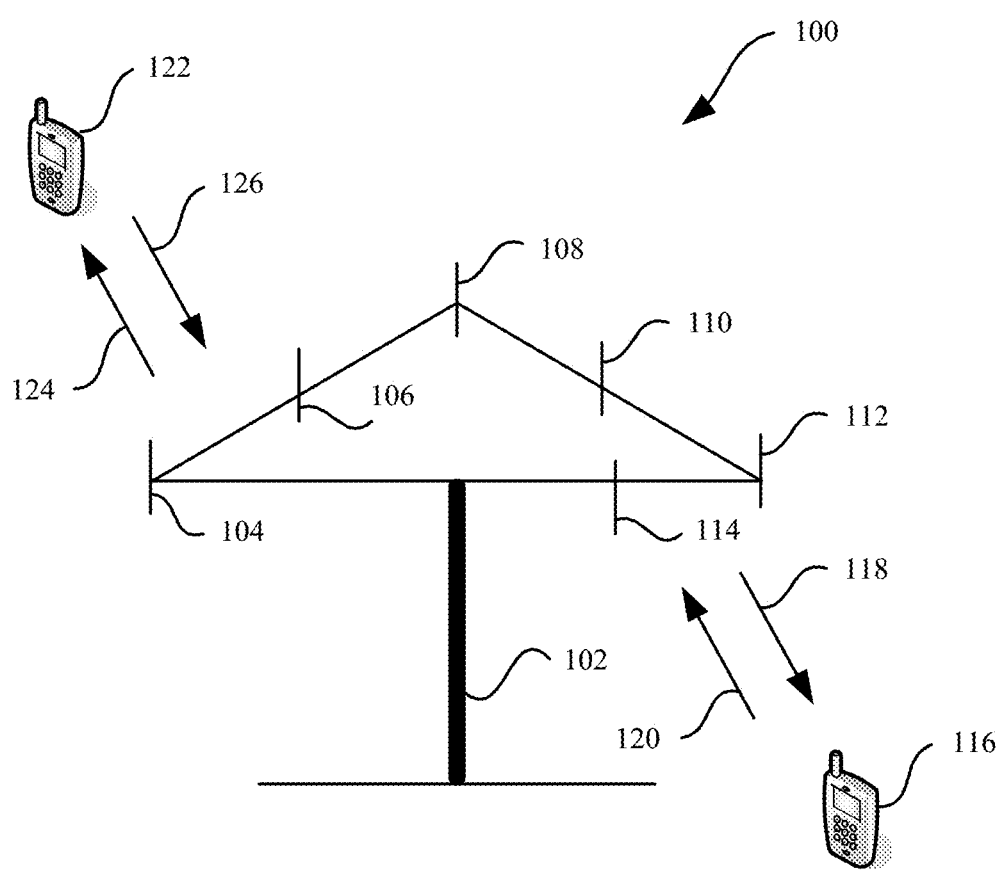
FIG. 1 is a schematic diagram of a communications system applicable to a reference signal sending method and a reference signal receiving method according to an embodiment of the present invention.

To facilitate understanding embodiments of the present invention, a communications system applicable to the embodiments of the present invention is first described in detail with reference to FIG. 1. FIG. 1 is a schematic diagram of a communications system applicable to a data transmission method and apparatus according to an embodiment of the present invention. As shown in FIG. 1, the communications system 100 includes a network device 102. The network device 102 may include a plurality of antennas, such as antennas 104, 106, 108, 110, 112, and 114. In addition, the network device 102 may additionally include a transmitter chain and a receiver chain. A person of ordinary skill in the art may understand that the transmitter chain and the receiver chain may each include a plurality of parts related to signal sending and receiving (for example, a processor, a modulator, a multiplexer, a demodulator, a demultiplexer, or an antenna).

It should be understood that, the network device may be a base transceiver station (base transceiver station, BTS) in global system for mobile communications (GSM) or code division multiple access (CDMA), may be a NodeB (NodeB, NB) in wideband code division multiple access (WCDMA), may be an evolved NodeB (evolutional node B, eNB or eNodeB) in long term evolution (LTE), may be a relay station, an access point, or a remote radio unit (Remote Radio Unit, RRU), or may be a vehicle-mounted device, a wearable device, and a network side device in a future 5G system, such as a transmission point (transmission point, TP), a transmission reception point (transmission reception point, TRP), a base station, or a small cell device. This is not particularly limited in this embodiment of the present invention.

The network device 102 may communicate with a plurality of terminal devices (for example, a terminal device 116 and a terminal device 122). The network device 102 may communicate with any quantity of terminal devices similar to the terminal device 116 or 122.

It should be understood that the terminal device may also be referred to as user equipment (User Equipment, UE), an access terminal, a subscriber unit, a subscriber station, a mobile station, a remote station, a remote terminal, a mobile device, a user terminal, a terminal, a wireless communications device, a user agent, a user apparatus, or the like. The terminal device may be a station (Station, ST) in a wireless local area network (wireless local area networks, WLAN), may be a cellular phone, a cordless phone, a session initiation protocol (session initiation protocol, SIP) phone, a wireless local loop (wireless local loop, WLL) station, a personal digital assistant (personal digital assistant, PDA) device, a handheld device having a wireless communication function, a computing device, another processing device connected to a wireless modem, a vehicle-mounted device, a wearable device and a next generation communications system, for example, a terminal device in a 5G network, or a terminal device in a future evolved public land mobile network (public land mobile network, PLMN). This is not particularly limited in this embodiment of this application.

As shown in FIG. 1, the terminal device 116 communicates with the antennas 112 and 114. The antennas 112 and 114 send information to the terminal device 116 over a forward link 118, and receive information from the terminal device 116 over a reverse link 120. In addition, the terminal device 122 communicates with the antennas 104 and 106. The antennas 104 and 106 send information to the terminal device 122 over a forward link 124, and receive information from the terminal device 122 over a reverse link 126.

For example, in a frequency division duplex (frequency division duplex, FDD) system, the forward link 118 may use a frequency band different from that used by the reverse link 120, and the forward link 124 may use a frequency band different from that used by the reverse link 126.

For another example, in a time division duplex (time division duplex, TDD) system and a full duplex (full duplex) system, the forward link 118 and the reverse link 120 may use a same frequency band, and the forward link 124 and the reverse link 126 may use a same frequency band.

Each antenna (or an antenna stack including a plurality of antennas) and/or area designed for communication is referred to as a sector of the network device 102. For example, the antenna stack may be designed to communicate with a terminal device in a sector within coverage of the network device 102. In a process in which the network device 102 communicates with the terminal devices 116 and 122 respectively over the forward links 118 and 124, a transmit antenna of the network device 102 may improve signal-to-noise ratios of the forward links 118 and 124 through beamforming. In addition, compared with a manner in which the network device sends a signal to all terminal devices of the network device by using a single antenna, when the network device 102 sends, through beamforming, a signal to the terminal devices 116 and 122 that are randomly scattered within related coverage, a mobile device in a neighboring cell suffers less interference.

The network device 102, the terminal device 116, or the terminal device 122 may be a wireless communications sending apparatus and/or a wireless communications receiving apparatus. When sending data, the wireless communications sending apparatus may encode data for transmission. Specifically, the wireless communications sending apparatus may obtain (for example, generate, receive from another communications apparatus, or store in a memory) a specific quantity of data bits that need to be sent to the wireless communications receiving apparatus through a channel. The data bits may be included in a transport block (or a plurality of transport blocks) of data, and the transport block may be segmented to generate a plurality of code blocks.

In addition, the communications system 100 may be a public land mobile network (PLMN), a device to device (device to device, D2D) network, a machine to machine (machine to machine, M2M) network, or another network. FIG. 1 is only a simplified schematic diagram shown for ease of understanding, and the network may further include another network device not shown in FIG. 1.

Figure 2:
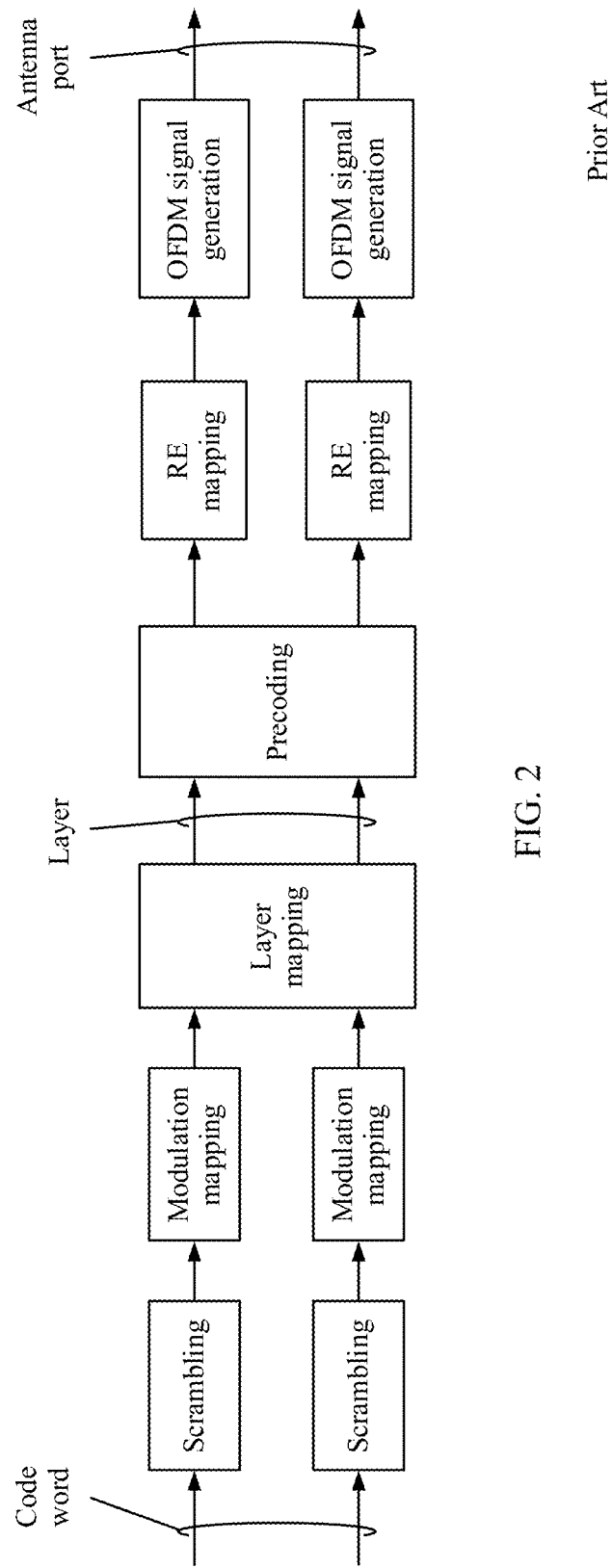
FIG. 2 is a schematic diagram of a downlink physical channel processing process used in an existing LTE system.

For ease of understanding the embodiments of the present invention, the following briefly describes a downlink physical channel processing process in an LTE system with reference to FIG. 2. FIG. 2 is a schematic diagram of a downlink physical channel processing process used in an existing LTE system. In the downlink physical channel processing process, a processed object is a code word, and the code word is usually a coded (including at least channel coded) bit stream. Scrambling (scrambling) is performed on the code word (code word), to generate a scrambled bit stream. Modulation mapping (modulation mapping) is performed on the scrambled bit stream, to obtain a modulation symbol stream. The modulation symbol stream is mapped to a plurality of layers (layer) through layer mapping (layer mapping). For ease of differentiation and description, in this embodiment of the present invention, the symbol stream obtained after the layer mapping may be referred to as a layer-mapping spatial layer (or referred to as a layer mapping spatial stream or a layer mapping symbol stream). Precoding (precoding) is performed on the layer-mapping spatial layer, to obtain a plurality of precoded data streams (or referred to as precoded symbol streams). The precoded symbol stream is mapped to a plurality of REs through resource element (RE) mapping. These REs are then modulated through orthogonal frequency division multiplexing (orthogonal frequency division multiplexing, OFDM), to generate an OFDM symbol stream. The OFDM symbol stream is then transmitted through an antenna port (antenna port).

In a precoding technology, when a channel state is known, a to-be-transmitted signal is preprocessed at a transmit end, in other words, the to-be-transmitted signal is processed by using a precoding matrix matching a channel resource, so that a precoded to-be-transmitted signal adapts to a channel, and complexity of eliminating inter-channel impact at a receive end is reduced. Therefore, received signal quality (for example, a signal to interference plus noise ratio (signal to interference plus noise ratio, SINR)) is improved by performing precoding processing on a transmitted signal. Therefore, by using the precoding technology, a transmit end device and a plurality of receive end devices can perform transmission on a same time-frequency resource, that is, multi-user multiple-input multiple-output (multiple user multiple input multiple output, MU-MIMO) is implemented. It should be noted that related description of the precoding technology is used as only an example, and is not used to limit the protection scope of the embodiments of the present invention. In a specific implementation process, precoding may alternatively be performed in another manner (for example, when a channel state cannot be learned of, precoding is performed by using a preset precoding matrix or in a weighted processing manner). Specific content is not described in this specification.

To obtain a precoding matrix that can adapt to a channel, a transmit end usually performs channel state information (CSI) measurement in advance by sending a reference signal, to obtain measurement feedback from a receive end, so as to determine a relatively accurate precoding matrix for performing precoding processing on to-be-sent data. Specifically, the transmit end may be a network device, the receive end may be a terminal device, and the reference signal may be a reference signal used for downlink channel measurement, for example, a channel state information reference signal (channel state information reference signal, CSI-RS). The terminal device may perform CSI measurement based on a received CSI-RS, and feed back CSI of a downlink channel to the network device. Alternatively, the transmit end may be a terminal device, the receive end may be a network device, and the reference signal may be a reference signal used for uplink channel measurement, for example, a sounding reference signal (sounding reference signal, SRS). The network device may perform CSI measurement based on a received RSR, to indicate CSI of an uplink channel to the terminal device. The CSI may include, for example, a precoding matrix indicator (precoding matrix indicator, PMI), a rank indication (rank indication, RI), and a channel quality indication (channel quality indicator, CQI).

In the prior art, a CSI-RS sent by a network device may be a non-precoded (non-precoded) CSI-RS, or may be a beamformed (beamformed) CSI-RS. The non-precoded CSI-RS may be used to measure a channel matrix, and a terminal device obtains a complete channel between a transmit antenna and a receive antenna through measurement. With development of a multiple-antenna technology, because there are a relatively large quantity of ports, pilot overheads are relatively high when channel measurement (which is specifically CSI measurement) is performed by using a non-precoded CSI-RS, power of each CSI-RS port is relatively low, and channel measurement accuracy is relatively low. A beamformed CSI-RS may be used to measure an equivalent channel matrix, and the terminal device obtains a beamformed equivalent channel through measurement. Therefore, a quantity of ports is reduced, pilot overheads are relatively low, and channel measurement accuracy is relatively high. However, even if the beamformed CSI-RS is used, the terminal device can perform CSI measurement only on an equivalent channel corresponding to a precoding vector (or a precoding matrix), greatly limiting flexibility and a spatial degree of freedom of network device scheduling.

In addition, when the channel state changes at a high speed, the terminal device moves at a high speed, or accurate CSI cannot be obtained, a relatively accurate precoding matrix cannot be obtained. Even if the beamformed CSI-RS is used, the terminal device may obtain only one PMI, and a precoding matrix determined based on the PMI may not adapt to the channel. Therefore, a to-be-transmitted signal obtained through precoding processing cannot accurately adapt to a current channel. Consequently, quality of a received signal deteriorates. Therefore, data transmission reliability cannot be ensured.

To improve transmission reliability, some new transmission solutions are proposed, and may include, for example, precoder cycling based transmit diversity (precoder cycling based transmit diversity). A network device using the transmission solutions may perform precoding on data through cycling, to obtain diversity gains in a plurality of dimensions, thereby improving signal receiving quality and transmission reliability. If channel measurement is still performed by using the foregoing listed non-precoded CSI-RS or beamformed CSI-RS, a terminal device can feed back only one PMI in measurement bandwidth, and cannot provide the network device with a basis for determining a precoding matrix used for cycling. Consequently, the network device cannot perform precoder cycling, and reliable data transmission cannot be ensured.

In view of this, this application provides a reference signal sending method and a reference signal receiving method. Therefore, more precoding vectors can be used to perform CSI measurement, to measure more equivalent channels, thereby improving flexibility and a spatial degree of freedom of network device scheduling. In addition, a precoding matrix used for cycling can be provided for the precoder cycling transmission solution, to ensure reliable data transmission, and improve robustness of a transmission system.

The following describes the technical solutions in this application in detail with reference to FIG. 3 to FIG. 7. It should be understood that these examples are merely intended to help a person skilled in the art better understand the embodiments of the present invention, instead of limiting the scope of the embodiments of the present invention.

It should be understood that the technical solutions in this application may be applied to all wireless communications systems using a multiple-antenna technology. For example, the wireless communications system may be the communications system 100 shown in FIG. 1. The communications system may include at least one network device and at least one terminal device, and the network device and the terminal device may communicate with each other through a wireless air interface. For example, the network device in the communications system may correspond to the network device 102 shown in FIG. 1, and the terminal device may correspond to the terminal device 116 or 122 shown in FIG. 1.

It should be further understood that, in an LTE-A system, to support the multiple-antenna technology, in a transmission mode earlier than transmission mode (transmission mode, TM) 9, a terminal device performs channel measurement by using a cell-specific reference signal (cell-specific reference signal, CRS), and a low-density resource distribution CSI-RS is introduced into Release (Release) 10 to replace an original CRS, thereby ensuring that a network device can perform multi-user scheduling based on CSI reported by the terminal device. However, it should be understood that a reference signal is not particularly limited in this application, regardless of a CSI-RS, a CRS, or even another reference signal that is used for channel measurement and that is defined in a future protocol, for example, a demodulation reference signal (demodulation reference signal, DMRS) used for channel measurement.

In the embodiments of the present invention, the reference signal may be a reference signal (denoted as a first reference signal for ease of differentiation and description) that is sent by the network device to the terminal device and that is used to measure a downlink channel, or may be a reference signal (denoted as a second reference signal for ease of differentiation and description) that is sent by the terminal device to the network device and that is used to measure an uplink channel. By way of example rather than limitation, the first reference signal may be a CSI-RS, and the second reference signal may be a sounding reference signal (sounding reference signal, SRS).

It should be understood that "first reference signal" and "second reference signal" are merely reference signals named for distinguishing uplink and downlink, and should not constitute any limitation on this application. Correspondingly, "first time-frequency resource set" and "second time-frequency resource set" described below are resources that are named for distinguishing uplink resources and downlink resources and that are used to bear reference signals, and should not constitute any limitation on this application.

It should be further understood that specific content of the foregoing listed reference signals is merely an example for description, and should not constitute any limitation on this application. A possibility that another reference signal is used to perform channel measurement is not excluded in this application.

With reference to the accompanying drawings, the following separately describes in detail, by using an example in which the network device sends the first reference signal to the terminal device and an example in which the terminal device sends the second reference signal to the network device, the reference signal sending method and the reference signal receiving method provided in the embodiments of the present invention.

Figure 3:
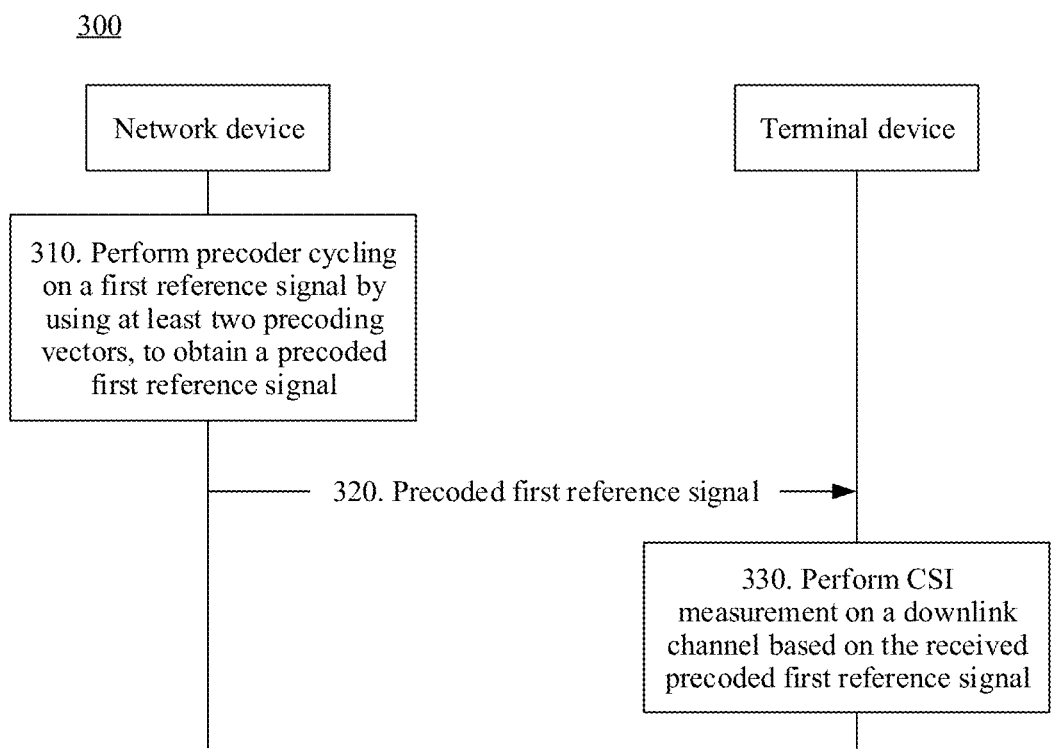
FIG. 3 is a schematic flowchart of a method for sending and receiving a reference signal according to an embodiment of the present invention.

FIG. 3 is a schematic flowchart of a method 300 for sending and receiving a first reference signal according to an embodiment of the present invention from a perspective of device interaction. The method 300 shown in FIG. 3 may include step 310 to step 330. The following describes the method 300 in detail with reference to FIG. 3.

Step 310. A network device performs precoder cycling on the first reference signal by using at least two precoding vectors, to obtain a precoded first reference signal.

Specifically, the precoded first reference signal may be borne in a plurality of physical resource groups (or resource groups for short), and each physical resource group may include at least one resource unit. The resource unit may be understood as a minimum scheduling unit of transmission on a physical layer. Each resource unit may be, for example, an RB defined in an LTE protocol, or may be an RBG including a plurality of RBs. This is not particularly limited in this application.

In other words, the precoded first reference signal may be borne in a plurality of resource units. However, it should be noted that this does not mean that each resource element (resource element, RE) in the plurality of resource elements bears the precoded first reference signal, and a resource (more specifically, an RE) in the plurality of resource units may be further used to bear data, another reference signal, or another physical channel. This is not particularly limited in this application.

Optionally, the RE used to bear the precoded first reference signal (for ease of description, a reference signal RE for short below) may be configured by the network device, and a location of the reference signal RE is notified to a terminal device by using resource configuration information. Alternatively, optionally, the reference signal RE may be determined by the network device based on a pilot pattern defined in a protocol and a port number of the first reference signal, and the port number of the first reference signal is notified to a terminal device by using resource configuration information, so that the terminal device determines the reference signal RE.

In this embodiment of the present invention, for ease of description, the plurality of physical resource groups may be referred to as a first time-frequency resource set. Bandwidth occupied by the first time-frequency resource set may be referred to as measurement bandwidth of the first reference signal. Specifically, the first time-frequency resource set may be a set of time-frequency resources that are preconfigured by the network device and that are used to send the first reference signal. However, it should be noted that a resource in the first time-frequency resource set is not limited to bearing one reference signal, or may be used to bear a plurality of reference signals. At least one reference signal (which may be understood as including the foregoing first reference signal) borne in the first time-frequency resource set may be referred to as a reference signal group, and the first time-frequency resource set may be referred to as a reference signal resource. For example, a resource that is configured by the network device and that is used to send a CSI-RS group may be referred to as a CSI-RS resource (CSI-RS resource).

It should be noted that reference signals and antenna ports (antenna port) may be in a one-to-one correspondence. A CSI-RS is used as an example. The antenna port may also be referred to as a CSI-RS port. One CSI-RS is defined by one CSI-RS port, and each CSI-RS corresponds to one antenna port.

When a resource in the first time-frequency resource set bears a plurality of reference signals, the resource configured for the plurality of reference signals may be time division multiplexed (time division multiplexing, TDM), or may be frequency division multiplexed (frequency division multiplexing, FDM), or may be code division multiplexed (code division multiplexing, CDM). In other words, the network device may distinguish different antenna ports in a TDM manner, an FDM manner, a CDM manner, or the like. If the FDM or TDM is used, frequency domain resources or time domain resources occupied by reference signals of different antenna ports may be different. If the CDM is used, time-frequency resources occupied by reference signals of different antenna ports may be the same, and the different antenna ports are distinguished by using a multiplexed code. A resource configuration manner of at least one first reference signal borne in the first time-frequency resource set is not particularly limited in this application.

It should be noted that, when a resource in the first time-frequency resource set bears a plurality of reference signals, a process in which the network device performs precoding processing on the plurality of reference signals may be the same, and a process in which the terminal device measures the plurality of received precoded reference signals may also be the same. In addition, the network device may simultaneously perform precoding processing on the plurality of reference signals, and the terminal device may simultaneously measure the plurality of received precoded reference signals. Precoding matrices corresponding to the plurality of reference signals borne in the first time-frequency resource set include precoding vectors that are in a one-to-one correspondence with the plurality of reference signals. In other words, when the first time-frequency resource set bears only one reference signal (for example, the first reference signal), the network device precodes the first reference signal by using a precoding vector. When the first time-frequency resource set bears a plurality of reference signals (for example, a plurality of reference signal including the first reference signal), the network device precodes the plurality of reference signals by using a precoding matrix, where the precoding matrix includes precoding vectors that are in a one-to-one correspondence with the reference signals. For brevity of the following description, description on a same or similar case is omitted. In this embodiment of the present invention, for ease of description, a specific process of sending and receiving the first reference signal is described by using a processing process of the first reference signal as an example, and should not constitute any limitation on this application.

It should further be noted that, in this embodiment of the present invention, the antenna port may be understood as a beamformed CSI-RS port. A quantity of beamformed CSI-RS ports is less than that of non-precoded CSI-RS ports, so that pilot overheads may be reduced, and a transmit power of each port is increased.

Different from a beamformed CSI-RS in the prior art, when performing precoding processing on the CSI-RS, the network device precodes the CSI-RS by using at least two precoding vectors, so that equivalent channels corresponding to more precoding vectors can be measured, to measure more equivalent channels, thereby improving flexibility and a spatial degree of freedom of network device scheduling.

In addition, the network device may precode the first reference signal by using at least two precoding vectors. The first reference signal corresponds to a same precoding vector in a same physical resource group, and the plurality of physical resource groups used to bear the first reference signal may correspond to the at least two precoding vectors.

In an optional embodiment, the network device may precode the first reference signal through cycling and by using the at least two precoding vectors. In any physical resource group, the first reference signal corresponds to a same precoding vector, and signals borne in any two adjacent physical resource groups (the adjacent physical resource groups are described in detail below with reference to the accompanying drawings) correspond to different precoding vectors. In other words, a quantity of the plurality of physical resource groups used to bear the first reference signal may be greater than or equal to a quantity of precoding vectors.

In an optional embodiment, the network device may precode, through cycling and by using at least two precoding matrices, a reference signal group (which may be understood that the reference signal group includes the foregoing first reference signal) borne in the first time-frequency resource set. In any physical resource, the reference signal group corresponds to a same precoding matrix, each precoding column vector corresponds to one reference signal, and signals borne in any two adjacent physical resources correspond to different precoding matrices.

It should be understood that a method for performing precoder cycling on the first reference signal by the network device by using the at least two precoding vectors and performing precoder cycling on the reference signal group by using the at least two precoding matrices is merely a possible implementation, and should not constitute any limitation on this application.

By performing the foregoing listed precoding processing on the first reference signal by the network device, CSI measurement may be performed on the first reference signal by using the at least two precoding vectors (or precoding matrices), to measure more equivalent channels. Compared with the prior art in which one reference signal is precoded by using one precoding vector in one measurement bandwidth to obtain CSI of an equivalent channel corresponding to the precoding vector, the technical solution in this application facilitates improving flexibility and a spatial degree of freedom of network device scheduling.

Optionally, in step 310, the network device performs precoder cycling on the first reference signal by using the at least two precoding vectors based on each parameter in a precoder cycling parameter group.

Specifically, the precoder cycling parameter group includes at least a quantity of precoding vectors (or precoding matrices) and a precoder cycling granularity.

The quantity of precoding vectors may be a quantity of precoding vectors used to precode the first reference signal. The precoder cycling granularity may also be referred to as a precoder cycling size, and may indicate a quantity of resource units included in one physical resource group, that is, a quantity of contiguous resource units using a same precoding vector (or precoding matrix). If the resource unit is an RB, the precoder cycling granularity may also be referred to as a precoding resource block group size (precoding resource block group size, PRG size) or a cycling PRG size (cycling PRG size).

It should be understood that the foregoing listed names of the parameters are merely examples, and should not constitute any limitation on this application. This application does not exclude a possibility that another name is defined for the quantity of precoding vectors (or precoding matrices) and the precoder cycling granularity in a future protocol, and a same or similar function is implemented.

It should be noted that in this embodiment, one reference signal (namely, the first reference signal) is used as an example to describe a correspondence between the at least two precoding vectors and the plurality of physical resource groups, but this should not constitute any limitation on this application. It has been described above that the plurality of physical resource groups may be used to bear a plurality of reference signals. If the plurality of physical resource groups are used to bear a plurality of reference signals, in step 310, the network device may perform precoder cycling on the plurality of reference signals by using at least two precoding matrices. In a physical resource group, each reference signal corresponds to one precoding vector, and a plurality of reference signals correspond to one precoding matrix. In this case, the precoding matrix includes the precoding vectors corresponding to the plurality of reference signals. In other words, a quantity of reference signals borne in the plurality of physical resource groups is equal to a quantity of precoding column vectors included in the precoding matrix. In this case, the foregoing precoder cycling parameter group may include at least a quantity of precoding matrices and a precoder cycling granularity.

In this embodiment of the present invention, for ease of description, it is assumed that a resource in the first time-frequency resource set bears n (n≥1 and n is a natural number) first reference signals, and a quantity of precoding matrices used to perform precoder cycling on the n first reference signals is y (y≥2 and y is a natural number), and the precoder cycling granularity is x (x≥1 and x is a natural number).

The following describes a correspondence between a plurality of physical resource groups and precoding matrices (or precoding vectors) and distribution of the plurality of physical resource groups in system bandwidth with reference to the accompanying drawings. In the plurality of accompanying drawings shown below, assuming that an RB is a resource unit, one physical resource group is one PRG.

Figure 4:
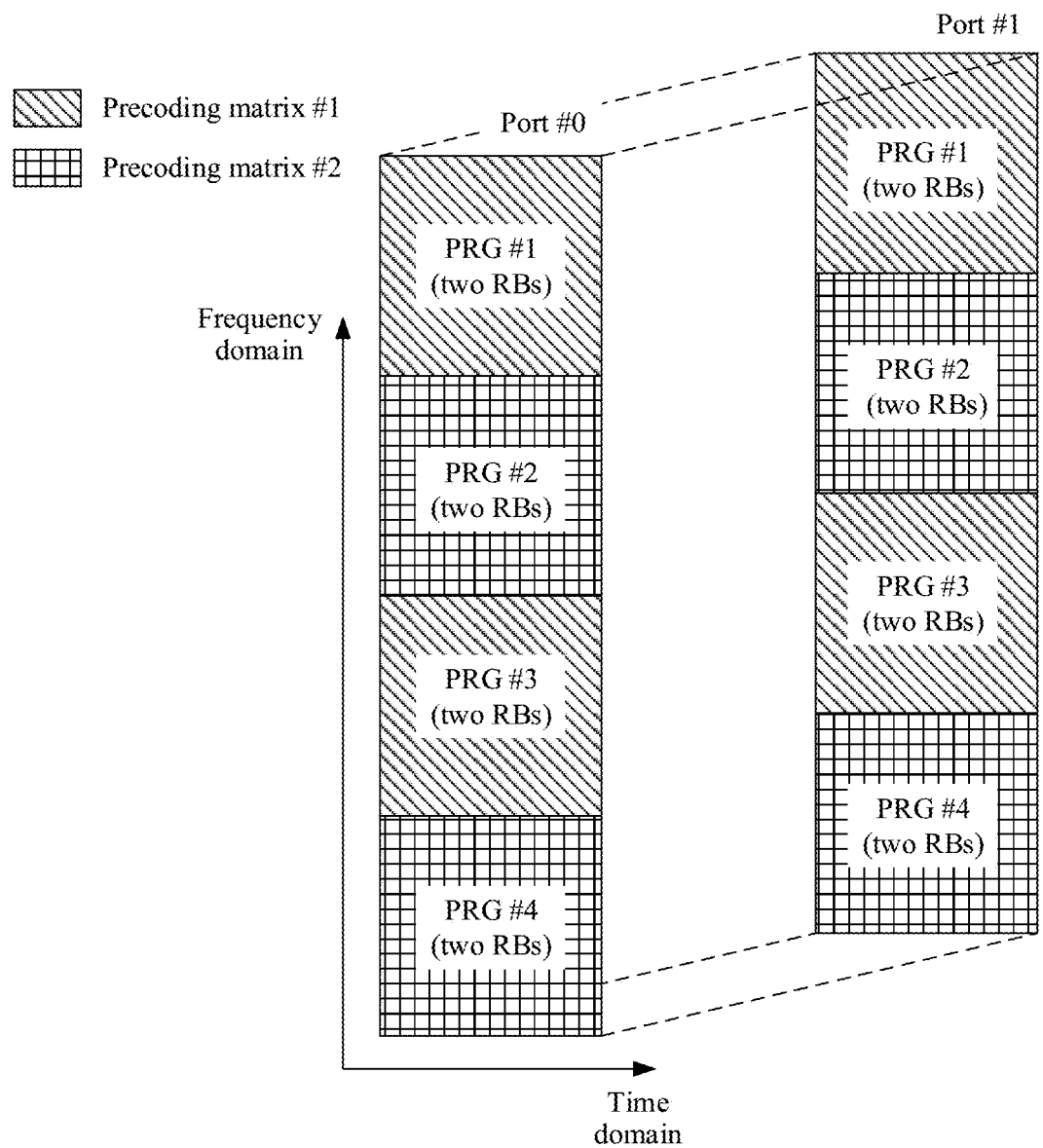
FIG. 4 is a schematic diagram of a correspondence between a plurality of physical resource groups and at least two precoding matrices.

FIG. 4 is a schematic diagram of a correspondence between a plurality of physical resource groups and at least two precoding matrices. As shown in the figure, it is assumed that n=2, y=2, and x=2. In this case, a resource in the first time-frequency resource set bears two reference signals (for example, as shown in FIG. 4, the two reference signals correspond to a port #0 and a port #1 respectively), and the network device performs precoder cycling on the two first reference signals by using two precoding matrices. As shown in FIG. 4, a PRG #1 corresponds to a precoding matrix #1. A PRG #2 corresponds to a precoding matrix #2. A PRG #3 corresponds to the precoding matrix #1. A PRG #4 corresponds to the precoding matrix #2. Because the precoder cycling granularity x=2, each physical resource group may include two resource units (for example, RBs). In addition, because the resource in the first time-frequency resource set bears the two reference signals, each precoding matrix may be a precoding matrix including two precoding column vectors. To be specific, in a same physical resource group, the two precoding column vectors are in a one-to-one correspondence with the two first reference signals, and the network device performs precoding processing on each first reference signal by using a precoding vector corresponding to the first reference signal. It should be noted that in a same physical resource group, precoding vectors corresponding to different reference signals may be the same or may be different. This is not particularly limited in this application.

It should be understood that, in FIG. 4, for ease of understanding and description, specific values are assigned to parameters in the precoder cycling parameter group, but this should not constitute any limitation on this application. For ease of description, the following still uses an example in which the first time-frequency resource set bears one reference signal (that is, the first reference signal) to describe this embodiment of the present invention. Therefore, the precoder cycling parameter of the first reference signal may include at least the quantity of precoding vectors and the precoder cycling granularity.

It should be noted that, the plurality of physical resource groups may be contiguously or discretely distributed in system bandwidth.

If the plurality of physical resource groups are contiguously distributed in the system bandwidth, the plurality of physical resource groups may be distributed on some contiguous resources or all resources in a wideband (wideband), or may be distributed in one or more contiguous or discontiguous sub-bands (subband), or may be distributed in one or more contiguous or discontiguous bandwidth parts (partial band). In 5G, different resource configuration parameters (numerologies) may be defined for a resource in bandwidth, for example, different subcarrier (sub carrier) spacings, and the bandwidth part may be a part of contiguous frequency bands having a same resource configuration parameter. That is, a wideband may include a plurality of bandwidth parts, and a resource in each bandwidth part has a same resource configuration parameter. For a sub-band, refer to a definition in an existing protocol (for example, an LTE protocol). A wideband may include a plurality of sub-bands, and the plurality of sub-bands in the wideband have a same resource configuration parameter (numerology). In addition, the sub-band may alternatively be defined in a bandwidth part, and the bandwidth part is distributed in the system wideband. This is not particularly limited in this application.

Figure 5:
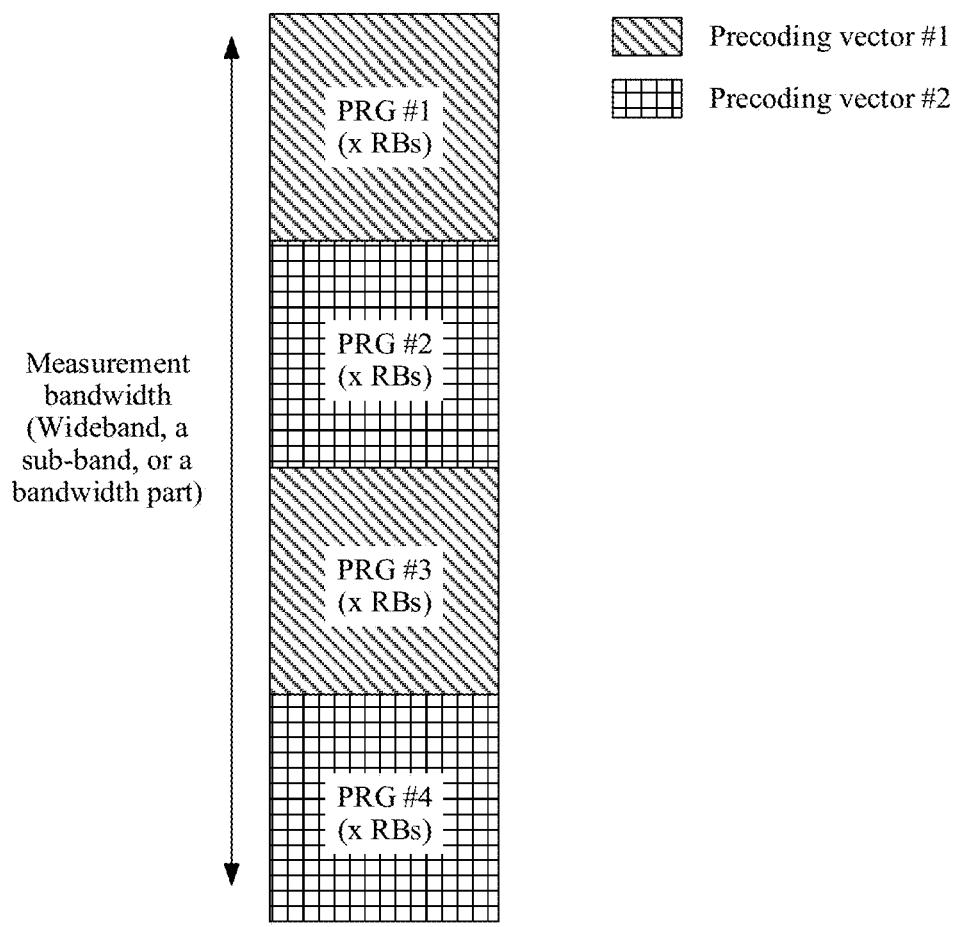
FIG. 5 is a schematic diagram of distribution of a plurality of physical resource groups in system bandwidth.

FIG. 5 shows contiguous distribution of the plurality of physical resource groups in the system bandwidth. FIG. 5 shows an example in which the first reference signal is borne in four PRGs, and the four PRGs are contiguously distributed in the system bandwidth. Therefore, the PRG #1 and the PRG #2, the PRG #2 and the PRG #3, the PRG #3 and the PRG #4 are physical resource groups adjacent to each other. It may be learned from the figure that any two adjacent physical resource groups correspond to different precoding matrices.

Figure 6:
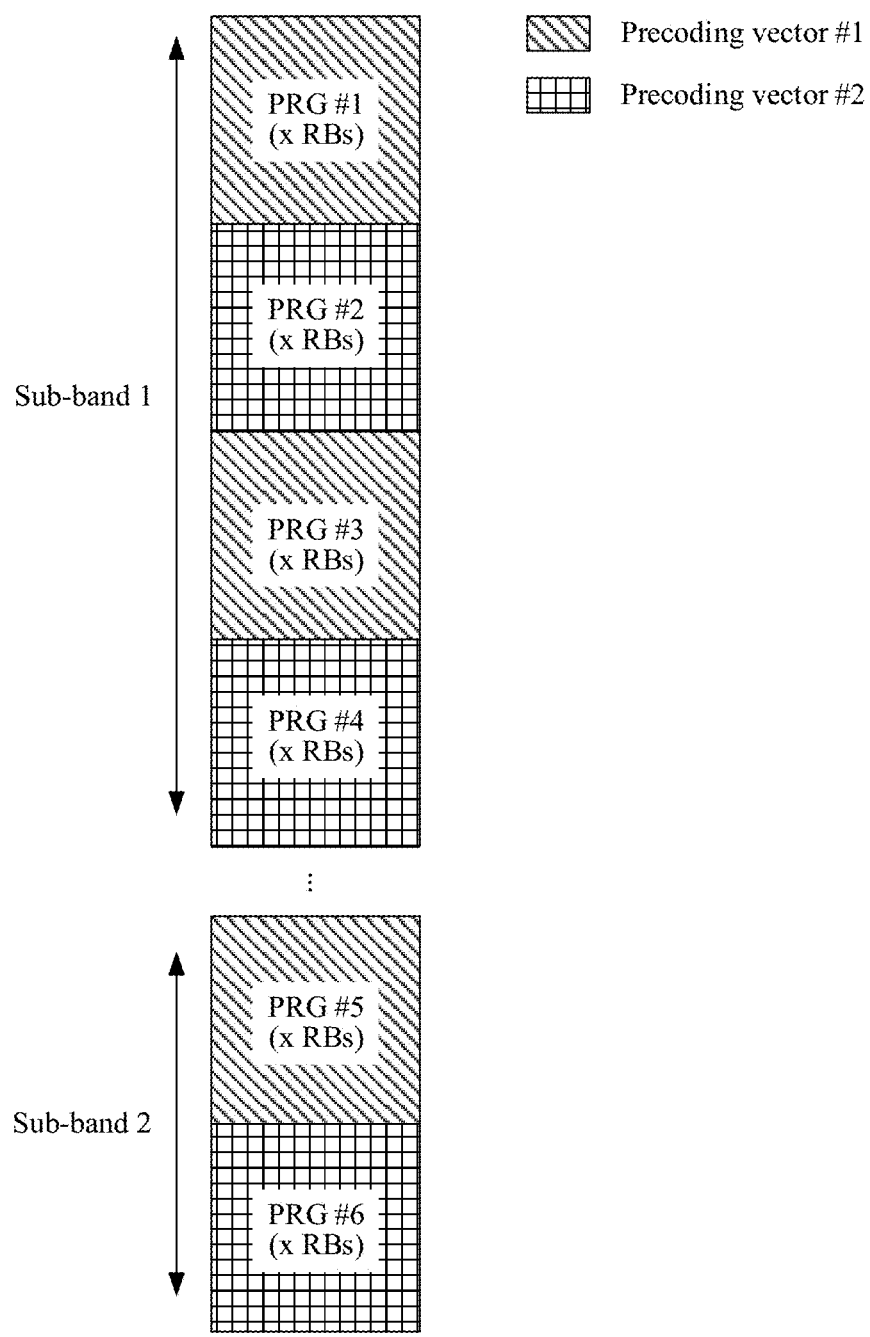
FIG. 6 is a another schematic diagram of distribution of a plurality of physical resource groups in system bandwidth.

If the plurality of physical resource groups are discretely distributed in the system bandwidth, the plurality of physical resource groups may be distributed on some discontiguous resources in the wideband, or may be distributed in a plurality of discontiguous sub-bands, or may be distributed in discontiguous bandwidth parts. For example, FIG. 6 shows discrete distribution of the plurality of physical resource groups in the system bandwidth. FIG. 6 shows an example in which the first reference signal is borne in six PRGs, and the six PRGs are discretely distributed in the system bandwidth. The PRG #1 to the PRG #4 are contiguously distributed in one sub-band (for example, a sub-band 1), and a PRG #5 and a PRG #6 are contiguously distributed in another sub-band (for example, a sub-band 2), but the sub-band 1 and the sub-band 2 are not contiguous. In this case, it may be considered that the PRG #1 and the PRG #2, the PRG #2 and the PRG #3, the PRG #3 and the PRG #4, the PRG #4 and the PRG #5, and the PRG #5 and the PRG #6 are physical resource groups adjacent to each other. It may be learned from the figure that any two adjacent physical resource groups correspond to different precoding matrices. Therefore, it may be understood that any two adjacent physical resource groups described above are not necessarily contiguously distributed on physical resources.

Step 320. The network device sends the precoded first reference signal to the terminal device by using the plurality of physical resource groups.

Correspondingly, in step 320, the terminal device receives, on the plurality of physical resource groups, the precoded first reference signal sent by the network device.

Specifically, after performing precoder cycling on the first reference signal to obtain the precoded first reference signal, the network device may map the precoded first reference signal to a corresponding RE, to transmit the precoded first reference signal to the terminal device by using the physical resource.

In this embodiment of the present invention, the correspondence between the plurality of physical resource groups and the precoding vectors may be preconfigured by the network device. For example, as shown in FIG. 5 or FIG. 6, the PRG #1, the PRG #3, and the PRG #5 correspond to the precoding vector #1, and the PRG #2, the PRG #4, and the PRG #6 correspond to the precoding vector #2. In addition, the network device may notify the terminal device of the resource configuration information, so that the terminal device receives the precoded first reference signal on a corresponding physical resource.

Optionally, the method 300 further includes:

sending, by the network device, resource configuration information to the terminal device, where the resource configuration information is used to indicate a time-frequency resource bearing the first reference signal.

Step 330. The terminal device performs CSI measurement on a downlink channel based on the received precoded first reference signal.

It should be understood that a specific process in which the terminal device performs CSI measurement based on the received precoded first reference signal may be similar to a specific process in the prior art in which a terminal device performs CSI measurement. For brevity, description of the specific process in which the terminal device performs CSI measurement is omitted herein. It should be noted that the precoded first reference signal received by the terminal device is obtained after precoder cycling is performed by using the at least two precoding vectors. Therefore, different equivalent channel matrices may be obtained through measurement based on different precoding vectors.

Optionally, in step 330, the terminal device may perform CSI measurement on the downlink channel based on each parameter in the precoder cycling parameter group and the received precoded first reference signal.

The parameters in the precoder cycling parameter group have been described in detail in step 310. To avoid repetition, details are not described herein again.

The following describes, with reference to specific embodiments, a specific process in which the terminal device obtains the precoder cycling parameter.

In this embodiment of the present invention, the terminal device may obtain a parameter in the precoder cycling parameter group in any one of the following manners:

Manner 1: At least one parameter in the precoder cycling parameter group is preconfigured in the network device and the terminal device.

Manner 2: The network device sends indication information of the precoder cycling parameter (denoted as first indication information for ease of differentiation and description) to the terminal device.

In the manner 1, the at least one parameter in the precoder cycling parameter group may be predefined, for example, defined in a protocol. The at least one predefined parameter may be preconfigured in the network device and the terminal device. For example, the at least one predefined parameter may be pre-stored in a memory of the network device and a memory of the terminal device, so that the network device and the terminal device each obtain the predefined parameter from the memory when performing a corresponding step.

Specifically, all parameters in the precoder cycling parameter group may be predefined in a protocol. The network device may perform precoder cycling on the first reference signal based on the parameters in the precoder cycling parameter group. The terminal device may divide, based on the parameters in the precoder cycling parameter group, the time-frequency resource bearing the precoded first reference signal, to obtain a plurality of resource groups (it may be understood that the plurality of resource groups correspond to the at least two precoding vectors), and then perform CSI measurement on the received precoded first reference signal, to obtain a plurality of equivalent channel matrices that are in a one-to-one correspondence with the plurality of resource groups.

Alternatively, some parameters in the precoder cycling parameter group may be predefined in a protocol, for example, a precoder cycling quantity y is predefined. Therefore, before performing precoder cycling on the first reference signal, the network device may determine the precoder cycling granularity x in advance, and perform precoder cycling on the first reference signal based on the precoder cycling quantity y and the precoder cycling granularity x. In this case, the manner 1 may be used in combination with the manner 2. To be specific, optionally, the network device may further send indication information (that is, an example of the first indication information) of the precoder cycling granularity x to the terminal device. When receiving the precoded first reference signal and the indication information of the precoder cycling granularity x, the terminal device may divide, based on the predefined precoder cycling quantity y and the precoder cycling granularity x indicated by the indication information, the time-frequency resource bearing the precoded first reference signal, to obtain the plurality of resource groups, and then perform CSI measurement based on the received precoded first reference signal, to obtain a plurality of equivalent channel matrices that are in a one-to-one correspondence with the plurality of resource groups.

In the manner 2, the at least one parameter in the precoder cycling parameter group may be determined by the network device and notified to the terminal device by using the first indication information.

Optionally, the network device sends the first indication information to the terminal device, where the first indication information includes an index of the precoder cycling parameter group or the at least one parameter in the precoder cycling parameter group.

In other words, specific content of the first indication information sent by the network device to the terminal device may be any one of the following:

a. the index of the precoder cycling parameter group;

b. all parameters in the precoder cycling parameter group; or c. some parameters in the precoder cycling parameter group.

Specifically, the network device may notify the terminal device of the index of the precoder cycling parameter group by using the first indication information, to reduce overheads caused by the indication information. Alternatively, the network device may directly notify the terminal device of the precoder cycling parameter, to reduce memory overheads caused by a one-to-one correspondence between precoder cycling parameter groups and indexes that needs to be pre-stored by the terminal device.

For example, the plurality of precoder cycling parameter groups may be defined in a protocol, and a one-to-one correspondence between the plurality of precoder cycling parameter groups and indexes is pre-stored in the network device and the terminal device, or a one-to-one correspondence between the plurality of precoder cycling parameter groups and indexes may be predefined and stored by the network device, and the terminal device may obtain the one-to-one correspondence between the plurality of precoder cycling parameter groups and the indexes from the network device. When the network device uses any one of the plurality of precoder cycling parameter groups, an index of the used parameter group may be indicated to the terminal device by using the first indication information.

Optionally, a specific method for sending the first indication information by the network device to the terminal device may include any one of the following:

sending, by the network device, a radio resource control (radio resource control, RRC) message to the terminal device, where the RRC message carries the first indication information;

sending, by the network device, a media access control (media access control, MAC) control element (control element, CE) to the terminal device, where the MAC CE carries the first indication information; or sending, by the network device, a physical downlink control channel (physical downlink control channel, PDCCH) to the terminal device, where the PDCCH carries the first indication information. Specifically, the first indication information is borne in DCI of the PDCCH.

In a possible embodiment, the first indication information may include two parts of information, which are respectively borne in an RRC message and DCI. Specifically, the network device may send a one-to-one correspondence between a plurality of precoder cycling parameter groups and indexes to the terminal device by using the RRC message. The plurality of precoder cycling parameter groups may be all or some precoder cycling parameter groups predefined by the network device. When the network device uses any one of the parameter groups to perform precoder cycling on the first reference signal, the network device sends the first indication information to the terminal device by using the DCI, to indicate an index of the used parameter group to the terminal device.

It should be understood that the foregoing listed message used to bear the first indication information is merely an example for description, and should not constitute any limitation on this application. A possibility that the first indication information is carried by using other signaling is not excluded in this application.

In a possible design, the first indication information may be configured in the resource configuration information sent by the network device to the terminal device.

Specifically, the resource configuration information is used to indicate, to the terminal device, the time-frequency resource bearing the precoded first reference signal, and the terminal device may receive the precoded first reference signal on the corresponding time-frequency resource based on the resource configuration information.

Optionally, the resource configuration information may include any one of the following:

a. resource configuration information of the first reference signal;

b. resource configuration information of a plurality of reference signals borne in the plurality of physical resource groups; or c. resource configuration information of a plurality of reference signals borne in a reference signal resource group, where the reference signal resource group includes the plurality of physical resource groups, and the plurality of reference signals borne in the reference signal resource group correspond to a same precoder cycling parameter.

Specifically, information included in the resource configuration information may be any one of the foregoing a, b, and c.

When the resource configuration information includes a, the network device may send corresponding resource configuration information for each reference signal. In other words, reference signals, resource configuration information of the reference signals, and precoder cycling parameters of the reference signals are in a one-to-one correspondence.

When the resource configuration information includes b, the network device may send resource configuration information for a plurality of reference signals borne in a same physical resource group. In this embodiment of the present invention, the same physical resource group may be the foregoing plurality of physical resource groups. Therefore, the plurality of reference signals borne in the plurality of physical resource groups include the foregoing first reference signal. In other words, a time-frequency resource of the plurality of reference signals in the same physical resource group may be determined based on one piece of resource configuration information. In addition, because the plurality of physical resource groups is a reference signal resource, precoder cycling parameters configured for the plurality of reference signals borne in the reference signal resource may be the same.

When the resource configuration information includes c, the network device may send resource configuration information for a plurality of reference signals borne in a reference signal resource group (for example, a CSI-RS resource group (CSI-RS resource set)) including the plurality of physical resource groups. In this embodiment of the present invention, because the plurality of physical resource groups bear the first reference signal, the plurality of reference signals borne in the resource set includes the first reference signal. In addition, precoder cycling parameters configured for the plurality of reference signals borne in the physical resource groups in the reference signal resource group may be the same.

Optionally, a specific method for sending the first indication information by the network device to the terminal device may include any one of the following:

sending, by the network device, an RRC message to the terminal device, where the RRC message includes resource configuration information, and the resource configuration information carries the first indication information;

sending, by the network device, a MAC CE to the terminal device, where the MAC CE includes resource configuration information, and the resource configuration information carries the first indication information; or sending, by the network device, DCI to the terminal device, where the DCI includes resource configuration information, and the resource configuration information carries the first indication information.

In another possible design, the first indication information may be configured in CSI reporting configuration information sent by the network device to the terminal device.

Specifically, the CSI reporting configuration information is used to indicate specific content of a reported measurement report to the terminal device. For example, if the first reference signal is a CSI-RS, the measurement report may be a CSI measurement report. The network device may instruct the terminal device to report one of a PMI, an RI, or a CQI, or optionally, CSI may further include another CSI parameter, another CSI type, or the like.

Optionally, the method 300 further includes:

sending, by the terminal device based on the CSI reporting configuration information, to the network device, a measurement report obtained through measurement based on the first reference signal.

In still another possible design, the first indication information may be configured in CSI measurement configuration information sent by the network device to the terminal device.

Optionally, the CSI measurement configuration information includes at least one of the following: CSI, a resource configuration indication, a quantity of to-be-measured channels, a to-be-measured interfering channel, and a CSI reporting configuration indication.

Specifically, the CSI measurement configuration information is used to indicate a correspondence between the resource configuration information and the CSI reporting configuration information. For example, the resource configuration information, the CSI reporting configuration information, and the CSI measurement configuration information may carry a same index (index). The CSI measurement configuration information may indicate a reference signal (for example, the first reference signal) to which the resource configuration information and the CSI reporting configuration information having a same index are directed. The resource configuration information indicates a configured time-frequency resource, and the CSI reporting configuration information may indicate CSI needing to be reported. Based on the CSI measurement configuration information, reference signals to which the resource configuration information and the CSI reporting configuration information are respectively directed may be determined.

Optionally, a specific method for sending the first indication information by the network device to the terminal device may include any one of the following:

sending, by the network device, an RRC message to the terminal device, where the RRC message includes CSI reporting configuration information, and the CSI reporting configuration information carries the first indication information;

sending, by the network device, a MAC CE to the terminal device, where the MAC CE includes CSI reporting configuration information, and the CSI reporting configuration information carries the first indication information; or sending, by the network device, DCI to the terminal device, where the DCI includes CSI reporting configuration information, and the CSI reporting configuration information carries the first indication information.

It should be understood that the foregoing listed two possible designs and specific signaling used to bear the first indication information are merely examples for description, and the network device may alternatively send the first indication information by using independent signaling. This is not particularly limited in this application.

Therefore, the network device sends the first indication information to the terminal device in the foregoing listed manners, to indicate the precoder cycling parameter to the network device. The terminal device may perform CSI measurement on the downlink channel based on the precoder cycling parameter and the precoded first reference signal received on each physical resource group.

Optionally, the method 300 further includes:

sending, by the network device, precoding mode indication information (denoted as second indication information for ease of differentiation and description) to the terminal device.

Specifically, the network device may independently determine whether to use a precoder cycling mode to precode the first reference signal. For example, when the terminal device is in a static state or has relatively low mobility, the terminal device can obtain an accurate channel state. In this case, the network device may perform channel measurement by using a non-precoded reference signal or a beamformed reference signal. When the terminal device is moving at a high speed, the terminal device may not obtain an accurate channel state. In this case, the network device may send a reference signal in a precoder cycling mode. Therefore, the network device may send second indication information to the terminal device, to indicate whether the precoder cycling mode is used for the first reference signal.

Optionally, the network device may indicate, to the terminal device by using an explicit indication method, whether the precoder cycling mode is used. In other words, an indication field is used to indicate the second indication information. For example, the second indication information may be a precoding mode index. For example, the second indication information may be a 1-bit indication field. When the bit location is "0", it indicates that the precoder cycling mode is not used. When the bit location is "1", it indicates that the precoder cycling mode is used.

Optionally, the network device may indicate, to the terminal device by using an implicit indication method, whether the precoder cycling mode is used. To be specific, no independent indication field is configured for the second indication information, and the implicit indication is performed by using an existing indication field used to indicate other information. Indication bits of two parameters in the precoder cycling parameter group may be used to jointly indicate whether the precoder cycling mode is used. For example, it is assumed that the two parameters in the precoder cycling parameter group separately correspond to 2-bit indication bits. If the two 2-bit indication bits are both "00", it is considered that the precoder cycling mode is not used. If at least one of the two 2-bit indication bits is not "00", it is considered that the precoder cycling mode is used. In this case, the second indication information and the first indication information are the same indication information.

Optionally, a specific method for sending the second indication information by the network device to the terminal device may include any one of the following:

sending, by the network device, an RRC message to the terminal device, where the RRC message carries the second indication information;

sending, by the network device, a MAC CE to the terminal device, where the MAC CE carries the second indication information; or sending, by the network device, a PDCCH to the terminal device, where the PDCCH carries the second indication information. Specifically, the second indication information is borne in DCI of the PDCCH.

Further, optionally, the specific method for sending the second indication information by the network device to the terminal device may include any one of the following:

sending, by the network device, an RRC message to the terminal device, where the RRC message includes resource configuration information, and the resource configuration information carries the second indication information;

sending, by the network device, a MAC CE to the terminal device, where the MAC CE includes resource configuration information, and the resource configuration information carries the second indication information; or sending, by the network device, DCI to the terminal device, where the DCI includes resource configuration information, and the resource configuration information carries the second indication information.

Optionally, the specific method for sending the second indication information by the network device to the terminal device may include any one of the following:

sending, by the network device, an RRC message to the terminal device, where the RRC message includes CSI reporting configuration information, and the CSI reporting configuration information carries the second indication information;

sending, by the network device, a MAC CE to the terminal device, where the MAC CE includes CSI reporting configuration information, and the CSI reporting configuration information carries the second indication information; or sending, by the network device, DCI to the terminal device, where the DCI includes CSI reporting configuration information, and the CSI reporting configuration information carries the second indication information.

Specific signaling used to bear the second indication information may be the same as or different from specific signaling used to bear the first indication information. For example, both the first indication information and the second indication information may be borne in the resource configuration information. Alternatively, the second indication information may be borne in the resource configuration information, and the first indication information may be borne in the CSI reporting configuration information. Alternatively, the first indication information may include two parts of information, and the two parts of information are respectively borne in the RRC message and the DCI. The second indication information may be borne in the DCI. This is not particularly limited in this application.

In addition, the network device may alternatively send only the first indication information or the second indication information to the terminal device. For example, if the network device does not use the precoder cycling mode, the network device may send only the second indication information to the terminal device, to notify the terminal device that the precoder cycling mode is not used. In this case, the network device does not need to send the first indication information to the terminal device. Alternatively, if the network device uses the precoder cycling mode, and the precoder cycling parameter is configured by the network device, the network device may send the first indication information to the terminal device, to notify the terminal device of the used precoder cycling parameter. In this case, the network device may not send the second indication information to the terminal device because the terminal device may determine that the network device uses the precoder cycling mode when the terminal device receives the precoder cycling parameter indicated by the first indication information.

The network device precodes the first reference signal through precoder cycling. Although the precoded first reference signal is borne in the plurality of physical resource groups, precoding vectors used by resource groups that are not adjacent to each other may be the same. For example, as shown in FIG. 5, the PRG #1 and the PRG #3 correspond to a same precoding vector: the precoding vector #1, and the PRG #2 and the PRG #4 correspond to a same precoding vector: the precoding vector #2. Therefore, after obtaining the precoder cycling parameter configured for the first reference signal, the terminal device may bind physical resource groups corresponding to a same precoding vector to perform channel measurement.

Optionally, in a possible implementation, step 330 specifically includes:

dividing, by the terminal device, resources in the plurality of physical resource groups based on parameters in the precoder cycling parameter group, to obtain at least two resource group sets, where the at least two resource group sets are in a one-to-one correspondence with at least two precoding matrices; and performing, by the terminal device on the at least two resource group sets, CSI measurement on a downlink channel for the received precoded first reference signal.

Certainly, the terminal device may alternatively independently perform CSI measurement on the downlink channel based on each parameter in the precoder cycling parameter group and the precoded first reference signal borne in the physical resource groups. This is not particularly limited in this application.

Then, the terminal device may process measurement results of physical resource groups corresponding to a same precoding vector, for example, average equivalent channels corresponding to the same precoding vector, or average other channel parameters corresponding to the same precoding vector. A method for processing a measurement result by the terminal device is not particularly limited in this application.

Therefore, in this embodiment of the present invention, the network device performs precoder cycling on the first reference signal by using the at least two precoding vectors, so that CSI measurement may be performed on a same reference signal by using at least two precoding vectors, that is, measurement is performed on equivalent channels corresponding to different precoding vectors, to measure more equivalent channels, thereby improving flexibility and a spatial degree of freedom of network device scheduling. Further, a precoding matrix used for cycling is provided for a precoder cycling transmission solution, to ensure reliable data transmission and improve robustness of a transmission system. Furthermore, because the first reference signal is precoded through precoder cycling, compared with a non-cycling case, a channel may be measured more fairly. Because two resources (for example, the PRG #1 and the PRG #2 shown in FIG. 4) that are relatively close to each other are measured by using different precoding vectors (for example, the precoding vector #1 and the precoding vector #2 shown in FIG. 5), that is, a same resource (for example, a resource including the PRG #1 and the PRG #2 shown in FIG. 4) is measured by using different precoding vectors (for example, corresponding to the precoding vector #1 and the precoding vector #2 shown in FIG. 5); and at the same time, measurement is performed once by using a same precoding vector (for example, the precoding vector #1 shown in FIG. 5) at regular frequencies (for example, the PRG #1 and the PRG #3 shown in FIG. 5), that is, measurement is performed at each small bandwidth granularity. Therefore, a measurement result obtained through the measurement is more accurate, thereby facilitating reliable data transmission and improving the robustness of the transmission system.

For a plurality of reference signals borne in the plurality of physical resource groups, the network device may perform precoder cycling on the plurality of reference signals by using the at least two precoding matrices, to measure equivalent channels corresponding to different precoding matrices.

A specific process of sending and receiving a first reference signal that is provided in this embodiment of the present invention is described above with reference to the accompanying drawings. A specific process of sending and receiving a second reference signal that is provided in another embodiment of the present invention is described in detail below with reference to the accompanying drawings.

Figure 7:
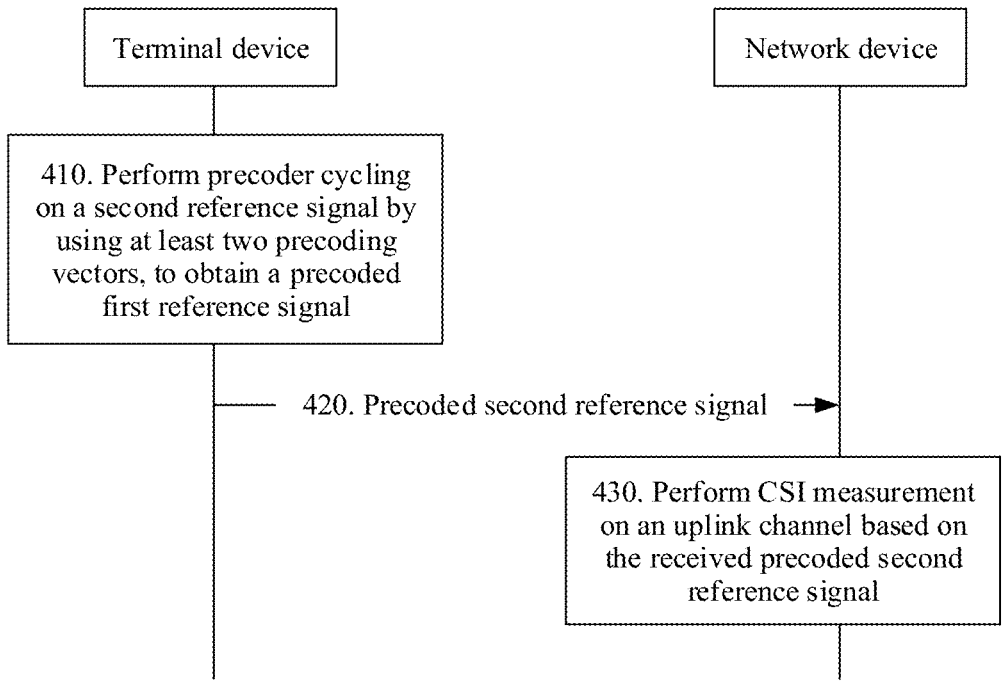
FIG. 7 is a schematic flowchart of a method for sending and receiving a reference signal according to another embodiment of the present invention.

FIG. 7 is a schematic flowchart of a method 400 for sending and receiving a second reference signal according to an embodiment of the present invention from a perspective of device interaction. As shown in FIG. 7, the method 400 shown in FIG. 7 may include step 410 to step 430. The following describes the method 400 in detail with reference to FIG. 7.

Step 410. A terminal device performs precoder cycling on a second reference signal by using at least two precoding vectors, to obtain a precoded second reference signal.

Specifically, a specific method used by the terminal device to perform precoder cycling on the second reference signal by using the at least two precoding vectors is the same as the specific method used by the network device to perform precoder cycling on the first reference signal by using the at least two precoding vectors in step 310 in the foregoing method 300. To avoid repetition, details are not described herein again.

In this embodiment of the present invention, the second reference signal is a reference signal used for measuring an uplink channel. For example, the second reference signal may be an SRS.

Optionally, step 410 specifically includes:
performing, by the terminal device, precoder cycling on the second reference signal by using the at least two precoding vectors based on each parameter in a precoder cycling parameter group.

The precoder cycling parameter group includes at least a quantity of precoding vectors and a precoder cycling granularity.

In this embodiment of the present invention, the terminal device may obtain a parameter in the precoder cycling parameter group in any one of the following manners:

Manner 1: At least one parameter in the precoder cycling parameter group is preconfigured in the network device and the terminal device.

That is, the at least one parameter in the precoder cycling parameter group is preconfigured in the terminal device and the network device.

Manner 2: The network device sends indication information of the precoder cycling parameter (denoted as third indication information for ease of differentiation and description) to the terminal device.

To be specific, the terminal device receives third indication information sent by the network device, where the third indication information includes an index of the precoder cycling parameter group or the at least one parameter in the precoder cycling parameter group.

Optionally, the method 400 further includes:
sending, by the network device, resource configuration information to the terminal device, where the resource configuration information indicates a time-frequency resource used to bear the precoded second reference signal.

After receiving the resource configuration information, the terminal device may determine the time-frequency resource used to bear the precoded second reference signal, to send the precoded second reference signal by using the time-frequency resource.

Optionally, the resource configuration information includes any one of the following:
resource configuration information of the second reference signal;
resource configuration information of a plurality of reference signals borne in the plurality of physical resource groups; or
resource configuration information of a plurality of reference signals borne in a resource set, where the resource set includes the plurality of physical resource groups, and the plurality of reference signals borne in the resource set correspond to a same precoder cycling parameter.

Optionally, the third indication information is configured in the resource configuration information.

Optionally, the method 400 further includes:
receiving, by the terminal device, fourth indication information sent by the network device, where the fourth indication information is used to indicate whether the terminal device uses a precoder cycling mode.

Optionally, the fourth indication information is configured in the resource configuration information.

Step 420. The terminal device sends the precoded second reference signal to the network device.

Correspondingly, in step 420, the network device receives the precoded second reference signal sent by the terminal device.

Because the network device configures, for the terminal device, the time-frequency resource on which the second reference signal is sent, the network device may directly receive the precoded second reference signal on the time-frequency resource.

In this embodiment of the present invention, the resource that is configured by the network device for the terminal device and that is used to bear the precoded second reference signal may be a plurality of physical resource groups. The plurality of physical resource groups correspond to at least two precoding vectors, the second reference signal corresponds to one precoding vector in a same physical resource group, and any two adjacent physical resource groups correspond to different precoding vectors.

In addition, the plurality of physical resource groups may form a reference signal resource set, used to bear one or more reference signals. A plurality of reference signals borne in the reference signal resource set correspond to one precoding matrix in a same physical resource group, and any two adjacent physical resource groups correspond to different precoding matrices. Each column vector in the precoding matrix corresponds to one reference signal, that is, corresponds to one antenna port.

It should be understood that a relationship between specific content of a precoder cycling parameter and the plurality of physical resource groups has been described in detail in the method 300. To avoid repetition, details are not described herein again.

Step 430. The network device performs CSI measurement on an uplink channel based on the received precoded second reference signal.

Optionally, step 430 specifically includes:

performing, by the network device, CSI measurement on the uplink channel based on each parameter in the precoder cycling parameter group and the precoded second reference signal.

The network device may perform CSI measurement on the uplink channel based on each parameter in the precoder cycling parameter group and the precoded second reference signal received on each physical resource group. A specific method for performing CSI measurement by the network device on the uplink channel on each physical resource group may be the same as a specific method for performing CSI measurement by a network device on an uplink channel in the prior art. For brevity, detailed descriptions of a specific process of the method are omitted herein.

Optionally, the method 400 further includes:

determining, by the network device, channel state information of a downlink channel based on channel state information of the uplink channel.

In a time division duplex (time division duplex, TDD) mode, the network device may determine the channel state information of the downlink channel based on the channel state information of the uplink channel by using channel reciprocity. In this case, the channel state information of the uplink channel obtained by the network device through measurement may be used to determine the channel state information of the downlink channel.

Certainly, the channel state information of the uplink channel obtained by the network device through measurement may be not limited to being used to determine the channel state information of the downlink channel, and may also be used to indicate the channel state information of the uplink channel to the terminal device, so that the terminal device performs uplink data transmission.

Optionally, the method 400 further includes:

sending, by the network device, the channel state information of the uplink channel to the terminal device.

After performing CSI measurement on the uplink channel, the network device may send the channel state information of the uplink channel to the terminal device based on a measurement result obtained through measurement, so that the terminal device performs data transmission based on the channel state information of the uplink channel indicated by the network device.

Therefore, in this embodiment of the present invention, the terminal device performs precoder cycling on the second reference signal by using the at least two precoding vectors, so that CSI measurement may be performed on the second reference signal by using the at least two precoding vectors, that is, measurement is performed on equivalent channels corresponding to different precoding vectors, to measure different equivalent channels. The CSI of the uplink channel that is obtained by the network device through measurement may be indicated to the terminal device, so that the terminal device performs uplink transmission, or may determine CSI of a downlink channel by using channel reciprocity, to perform downlink transmission. Therefore, compared with the prior art, in the technical solutions in this application, more measurement results can be obtained, thereby improving flexibility and a spatial degree of freedom of network device scheduling. Further, a precoding matrix used for cycling is provided for a precoder cycling transmission solution, to ensure reliable data transmission and improve robustness of a transmission system. Furthermore, because the second reference signal is precoded through precoder cycling, compared with a non-cycling case, a channel may be measured more fairly. Two resources that are relatively close to each other are measured by using different precoding vectors, that is, a same resource is measured by using different precoding vectors. In addition, measurement is performed once by using a same precoding vector at regular frequencies, that is, measurement is performed at each small bandwidth granularity. Therefore, a measurement result obtained through the measurement is more accurate, thereby facilitating reliable data transmission and improving the robustness of the transmission system.

The methods for sending and receiving a reference signal method provided in the embodiments of the present invention are described in detail above with reference to FIG. 3 to FIG. 7. A network device and a terminal device that are provided in the embodiments of the present invention are described in detail below with reference to FIG. 8 to FIG. 13.

Figure 8:
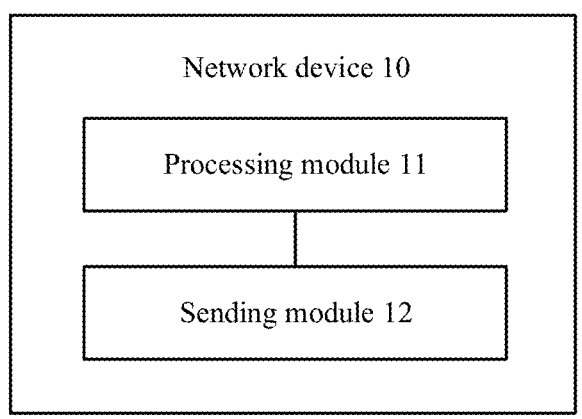
FIG. 8 is a schematic block diagram of a network device according to an embodiment of the present invention.

FIG. 8 is a schematic block diagram of a network device 10 according to an embodiment of the present invention. As shown in FIG. 8, the network device 10 includes a processing module 11 and a sending module 12.

Specifically, the network device 10 may correspond to the network device in the method 300 for sending and receiving a reference signal in the embodiments of the present invention. The network device 10 may include modules configured to perform the method performed by the network device in the method 300 for sending and receiving a reference signal in FIG. 3. In addition, the modules in the network device 10 and the foregoing other operations and/or functions are respectively intended to implement corresponding procedures of the method 300 for sending and receiving a reference signal in FIG. 3. For brevity, details are not described herein.

Figure 9:
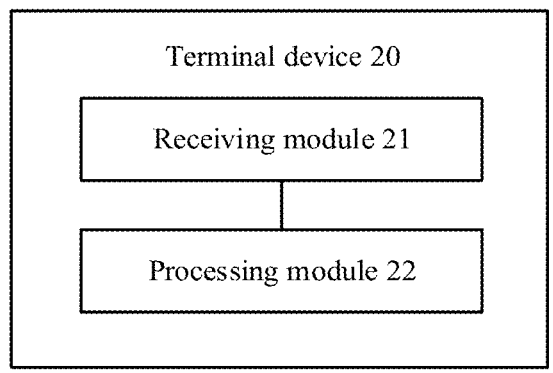
FIG. 9 is a schematic block diagram of a terminal device according to an embodiment of the present invention.

FIG. 9 is a schematic block diagram of a terminal device 20 according to an embodiment of the present invention. As shown in FIG. 9, the terminal device 20 includes a receiving module 21 and a processing module 22.

Specifically, the terminal device 20 may correspond to the terminal device in the method 300 for sending and receiving a reference signal in the embodiments of the present invention. The terminal device 20 may include modules configured to perform the method performed by the terminal device in the method 300 for sending and receiving a reference signal in FIG. 3. In addition, the modules in the terminal device 20 and the foregoing other operations and/or functions are respectively intended to implement corresponding procedures of the method 300 for sending and receiving a reference signal in FIG. 3. For brevity, details are not described herein.

Figure 10:
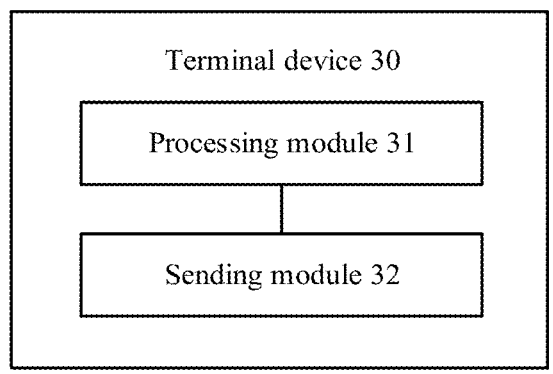
FIG. 10 is a schematic block diagram of a terminal device according to another embodiment of the present invention.

FIG. 10 is a schematic block diagram of a terminal device 30 according to another embodiment of the present invention. As shown in FIG. 10, the terminal device 30 includes a processing module 31 and a sending module 32.

The processing module 31 is configured to perform precoder cycling on a second reference signal by using at least two precoding vectors, to obtain a precoded second reference signal, where the precoded second reference signal is borne in a plurality of physical resource groups, and signals borne in any two adjacent physical resource groups correspond to different precoding vectors.

The sending module 32 is configured to send the precoded second reference signal to the network device, where the second reference signal is used by the network device to perform channel state information CSI measurement on an uplink channel.

Optionally, the processing module 31 is specifically configured to perform precoder cycling on the second reference signal by using the at least two precoding vectors based on each parameter in a precoder cycling parameter group.

Optionally, the precoder cycling parameter group includes at least a quantity of precoding vectors and a precoder cycling granularity.

Optionally, at least one parameter in the precoder cycling parameter group is preconfigured in the network device and the terminal device.

Optionally, the terminal device 30 further includes a receiving module, configured to receive third indication information sent by the network device, where the third indication information includes an index of the precoder cycling parameter group or the at least one parameter in the precoder cycling parameter group.

Optionally, the receiving module is further configured to receive fourth indication information sent by the network device, where the fourth indication information is used to indicate whether the terminal device uses a precoder cycling mode.

Specifically, the terminal device 30 may correspond to the terminal device in the method 400 for sending and receiving a reference signal in the embodiments of the present invention. The terminal device 30 may include modules configured to perform the method performed by the terminal device in the method 400 for sending and receiving a reference signal in FIG. 7. In addition, the modules in the terminal device 30 and the foregoing other operations and/or functions are respectively intended to implement corresponding procedures of the method 400 for sending and receiving a reference signal in FIG. 7. For brevity, details are not described herein.

Figure 11:
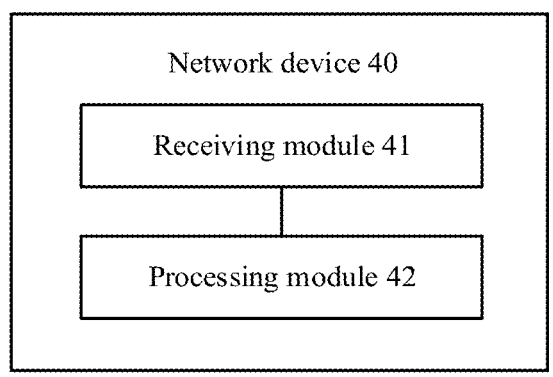
FIG. 11 is a schematic block diagram of a network device according to another embodiment of the present invention.

FIG. 11 is a schematic block diagram of a network device 40 according to another embodiment of the present invention. As shown in FIG. 11, the network device 40 includes a receiving module 41 and a processing module 42.

The receiving module 41 is configured to receive, by using a plurality of physical resource groups, a precoded second reference signal sent by a terminal device, where signals borne in any two adjacent physical resource groups correspond to different precoding vectors.

The processing module 42 is configured to perform CSI measurement on an uplink channel based on the precoded second reference signal.

Optionally, the processing module 42 is specifically configured to perform CSI measurement on the uplink channel based on each parameter in a precoder cycling parameter group and the precoded second reference signal.

Optionally, the precoder cycling parameter group includes at least a quantity of precoding vectors and a precoder cycling granularity.

Optionally, at least one parameter in the precoder cycling parameter group is preconfigured in the network device and the terminal device.

Optionally, the network device 40 further includes a sending module, configured to send third indication information to the terminal device, where the third indication information includes an index of the precoder cycling parameter group or the at least one parameter in the precoder cycling parameter group.

Optionally, the sending module is further configured to send fourth indication information to the terminal device, where the fourth indication information is used to indicate whether the terminal device uses a precoder cycling mode.

Specifically, the network device 40 may correspond to the network device in the method 400 for sending and receiving a reference signal in the embodiments of the present invention. The network device 40 may include modules configured to perform the method performed by the network device in the method 400 for sending and receiving a reference signal in FIG. 7. In addition, the modules in the network device 40 and the foregoing other operations and/or functions are respectively intended to implement corresponding procedures of the method 400 for sending and receiving a reference signal in FIG. 7. For brevity, details are not described herein.

Figure 12:
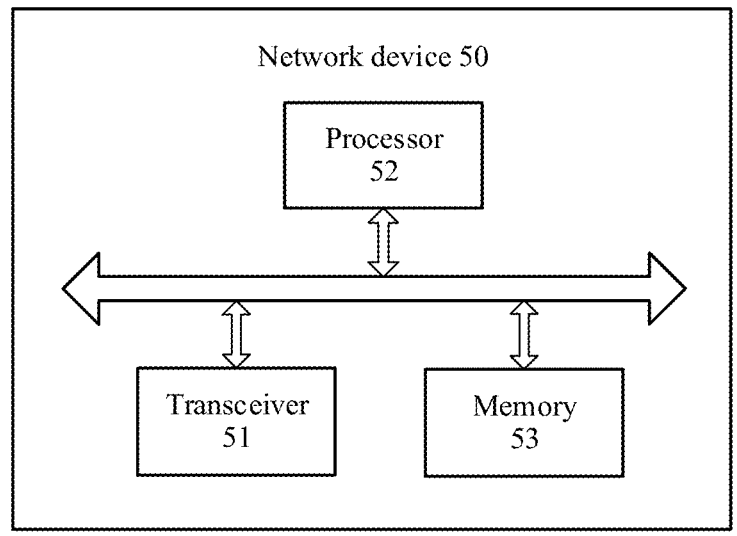
FIG. 12 is another schematic block diagram of a network device according to an embodiment of the present invention.

FIG. 12 is a schematic block diagram of a network device 50 according to an embodiment of the present invention. As shown in FIG. 12, the network device 50 includes a transceiver 51, a processor 52, and a memory 53. The transceiver 51, the processor 52, and the memory 53 communicate with each other through an internal connection path, and transfer a control signal and/or a data signal. The memory 53 is configured to store a computer program. The processor 52 is configured to invoke the computer program from the memory 53 and run the computer program, to control the transceiver 51 to send and receive a signal. The memory 53 may be disposed in the processor 52, or may be independent of the processor 52.

Specifically, the network device 50 may correspond to the network device in the method 300 for sending and receiving a reference signal in the embodiments of the present invention. The network device 50 may include units configured to perform the method performed by the network device in the method 300 for sending and receiving a reference signal in FIG. 3. In addition, the units in the network device 50 and the foregoing other operations and/or functions are respectively intended to implement corresponding procedures of the method 300 for sending and receiving a reference signal in FIG. 3. For brevity, details are not described herein.

Alternatively, the network device 50 may correspond to the network device in the method 400 for sending and receiving a reference signal in the embodiments of the present invention. The network device 50 may include units configured to perform the method performed by the network device in the method 400 for sending and receiving a reference signal in FIG. 7. In addition, the units in the network device 50 and the foregoing other operations and/or functions are respectively intended to implement corresponding procedures of the method 400 for sending and receiving a reference signal in FIG. 7. For brevity, details are not described herein.

Figure 13:
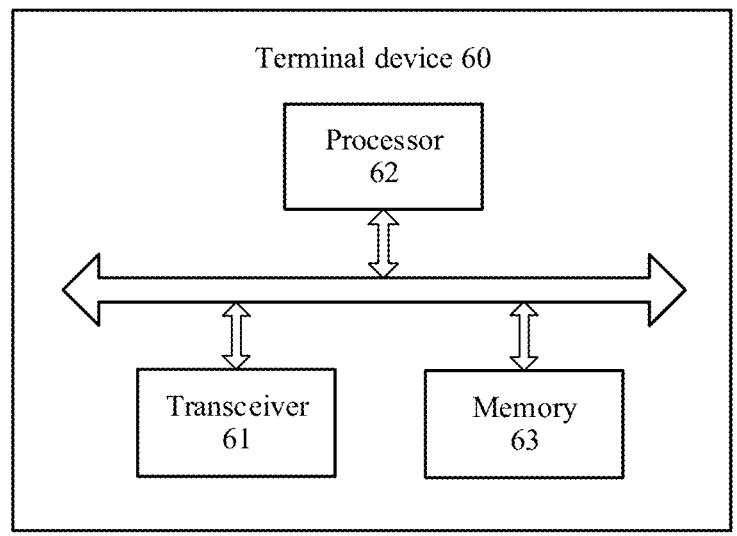
FIG. 13 is another schematic block diagram of a terminal device according to an embodiment of the present invention.

FIG. 13 is a schematic block diagram of a terminal device 60 according to an embodiment of the present invention. As shown in FIG. 13, the terminal device 60 includes a transceiver 61, a processor 62, and a memory 63. The transceiver 61, the processor 62, and the memory 63 communicate with each other through an internal connection path, and transfer a control signal and/or a data signal. The memory 63 is configured to store a computer program. The processor 62 is configured to invoke the computer program from the memory 63 and run the computer program, to control the transceiver 61 to send and receive a signal. The memory 63 may be disposed in the processor 62, or may be independent of the processor 62.

Specifically, the terminal device 60 may correspond to the terminal device in the method 300 for sending and receiving a reference signal in the embodiments of the present invention. The terminal device 60 may include units configured to perform the method performed by the terminal device in the method 300 for sending and receiving a reference signal in FIG. 3. In addition, the units in the terminal device 60 and the foregoing other operations and/or functions are respectively intended to implement corresponding procedures of the method 300 for sending and receiving a reference signal in FIG. 3. For brevity, details are not described herein.

Alternatively, the terminal device 60 may correspond to the terminal device in the method 400 for sending and receiving a reference signal in the embodiments of the present invention. The terminal device 60 may include units configured to perform the method performed by the terminal device in the method 400 for sending and receiving a reference signal in FIG. 7. In addition, the units in the terminal device 60 and the foregoing other operations and/or functions are respectively intended to implement corresponding procedures of the method 400 for sending and receiving a reference signal in FIG. 7. For brevity, details are not described herein.

It should be understood that, the processor in the embodiments of this application may be a central processing unit (central processing unit, CPU), or may be another general purpose processor, a digital signal processor (digital signal processor, DSP), an application-specific integrated circuit (application specific integrated circuit, ASIC), a field programmable gate array (field programmable gate array, FPGA), or another programmable logical device, discrete gate or transistor logical device, discrete hardware component, or the like. The general purpose processor may be a microprocessor, or the processor may be any conventional processor or the like.

It may be further understood that the memory in the embodiments of the present invention may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of random access memories (random access memory, RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

All or some of the foregoing embodiments may be implemented by using software, hardware, firmware, or any combination thereof. When implemented by using software, the foregoing embodiments may be implemented completely or partially in a form of a computer program product. The computer program product includes one or more computer instructions. When the computer program instructions are loaded or executed on a computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, including one or more usable medium sets. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A reference signal sending method, comprising:
    performing, by a network device, precoder cycling on a first reference signal by using at least two precoding vectors, to obtain a precoded first reference signal, wherein the precoded first reference signal is carried in a plurality of physical resource groups, and other signals carried in any two adjacent physical resource groups correspond to different precoding vectors; and
    sending, by the network device, the precoded first reference signal to a terminal device by using the plurality of physical resource groups, wherein the precoded first reference signal is used by the terminal device to perform channel state information (CSI) measurement on a downlink channel,
    wherein the performing, by the network device, precoder cycling on the first reference signal by using the at least two precoding vectors comprises:
    performing, by the network device, precoder cycling on the first reference signal by using the at least two precoding vectors based on each parameter in a precoder cycling parameter group, wherein
    the precoder cycling parameter group comprises at least a quantity of precoding vectors and a precoder cycling granularity.

2. The method according to claim 1, wherein at least one parameter in the precoder cycling parameter group is preconfigured in the network device and the terminal device.

3. The method according to claim 1, wherein the method further comprises:
    sending, by the network device, first indication information to the terminal device, wherein the first indication information comprises an index of the precoder cycling parameter group or at least one parameter in the precoder cycling parameter group.

4. The method according to claim 1, wherein the method further comprises:
    sending, by the network device, first indication information to the terminal device, wherein the first indication information is used to indicate whether a precoder cycling mode is used for the precoded first reference signal.

5. A reference signal receiving method, comprising:
    receiving, by a terminal device by using a plurality of physical resource groups, a precoded first reference signal sent by a network device, wherein other signals carried in any two adjacent physical resource groups correspond to different precoding vectors; and
    performing, by the terminal device, channel state information (CSI) measurement on a downlink channel based on the precoded first reference signal,
    wherein the performing, by the terminal device, CSI measurement on the downlink channel based on the precoded first reference signal comprises:
    performing, by the terminal device, CSI measurement on the downlink channel based on each parameter in a precoder cycling parameter group and the precoded first reference signal, wherein
    the precoder cycling parameter group comprises at least a quantity of precoding vectors and a precoder cycling granularity.

6. The method according to claim 5, wherein at least one parameter in the precoder cycling parameter group is preconfigured in the terminal device and the network device.

7. The method according to claim 5, wherein the method further comprises:
    receiving, by the terminal device, first indication information sent by the network device, wherein the first indication information comprises: an index of the precoder cycling parameter group or at least one parameter in the precoder cycling parameter group.

8. The method according to claim 5, wherein the method further comprises:
    receiving, by the terminal device, first indication information sent by the network device, wherein the first indication information is used to indicate whether a precoder cycling mode is used for the precoded first reference signal.

9. A network device, comprising:
    a processing module, configured to perform precoder cycling on a first reference signal by using at least two precoding vectors, to obtain a precoded first reference signal, wherein the precoded first reference signal is carried in a plurality of physical resource groups, and other signals carried in any two adjacent physical resource groups correspond to different precoding vectors; and a sending module, configured to send the precoded first reference signal to a terminal device by using the plurality of physical resource groups, wherein the precoded first reference signal is used by the terminal device to perform channel state information (CSI) measurement on a downlink channel, wherein the processing module is specifically configured to perform precoder cycling on the first reference signal by using the at least two precoding vectors based on each parameter in a precoder cycling parameter group, wherein the precoder cycling parameter group comprises at least a quantity of precoding vectors and a precoder cycling granularity.

10. The network device according to claim 9, wherein at least one parameter in the precoder cycling parameter group is preconfigured in the network device and the terminal device.

11. The network device according to claim 9, wherein the sending module is further configured to send first indication information to the terminal device, wherein the first indication information comprises an index of the precoder cycling parameter group or at least one parameter in the precoder cycling parameter group.

12. The network device according to claim 9, wherein the sending module is further configured to send first indication information to the terminal device, wherein the first indication information is used to indicate whether a precoder cycling mode is used for the precoded first reference signal.

13. A terminal device, comprising:

a receiving module, configured to receive a precoded first reference signal sent by a network device, wherein the precoded first reference signal is carried in a plurality of physical resource groups, and other signals carried in any two adjacent physical resource groups correspond to different precoding vectors; and a processing module, configured to perform channel state information (CSI) measurement on a downlink channel based on the precoded first reference signal, wherein the processing module is specifically configured to perform CSI measurement on the downlink channel based on each parameter in a precoder cycling parameter group and the precoded first reference signal, wherein the precoder cycling parameter group comprises at least a quantity of precoding vectors and a precoder cycling granularity.

14. The terminal device according to claim 13, wherein at least one parameter in the precoder cycling parameter group is preconfigured in the terminal device and the network device.

15. The terminal device according to claim 13, wherein the receiving module is further configured to receive first indication information sent by the network device, wherein the first indication information comprises an index of the precoder cycling parameter group or at least one parameter in the precoder cycling parameter group.

16. The terminal device according to claim 13, wherein the receiving module is further configured to receive first indication information sent by the network device, wherein the first indication information is used to indicate whether a precoder cycling mode is used for the precoded first reference signal.

* * * * *